US011512181B2

(12) United States Patent
Grosser et al.

(10) Patent No.: US 11,512,181 B2
(45) Date of Patent: Nov. 29, 2022

(54) LASER BEAM-PERMEABLE SUBSTRATE MATERIAL FOR USE ON SENSORS

(71) Applicant: Covestro Deutschland AG, Leverkusen (DE)

(72) Inventors: Ulrich Grosser, Kürten (DE); Alexander Meyer, Düsseldorf (DE); Andreas Klein, Leverkusen (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 620 days.

(21) Appl. No.: 16/607,247

(22) PCT Filed: Apr. 23, 2018

(86) PCT No.: PCT/EP2018/060306
§ 371 (c)(1),
(2) Date: Oct. 22, 2019

(87) PCT Pub. No.: WO2018/197398
PCT Pub. Date: Nov. 1, 2018

(65) Prior Publication Data
US 2020/0377692 A1 Dec. 3, 2020

(30) Foreign Application Priority Data
Apr. 24, 2017 (EP) .................................... 17167701

(51) Int. Cl.
| | | |
|---|---|---|
| *C08K 5/3437* | (2006.01) |
| *G01S 17/931* | (2020.01) |
| *C08K 5/18* | (2006.01) |
| *C08K 5/3445* | (2006.01) |
| *C08K 5/3465* | (2006.01) |
| *C08K 5/375* | (2006.01) |
| *C08L 69/00* | (2006.01) |
| *C09B 1/16* | (2006.01) |
| *C09B 57/00* | (2006.01) |
| *G01S 7/481* | (2006.01) |

(52) U.S. Cl.
CPC .............. *C08K 5/3437* (2013.01); *C08K 5/18* (2013.01); *C08K 5/3445* (2013.01); *C08K 5/3465* (2013.01); *C08K 5/375* (2013.01); *C08L 69/00* (2013.01); *C09B 1/16* (2013.01); *C09B 57/00* (2013.01); *G01S 7/4813* (2013.01); *G01S 17/931* (2020.01)

(58) Field of Classification Search
CPC ...... C08K 5/3437; C08K 5/18; C08K 5/3445; C08K 5/3465; C08K 5/375; C08K 5/0041; C08K 2201/019; C08L 69/00; C08L 33/12; C08L 69/005; C09B 1/16; C09B 57/00; G01S 7/4813; G01S 17/931
USPC ........................................................ 356/4.01
See application file for complete search history.

(56) References Cited

U.S. PATENT DOCUMENTS

| | | |
|---|---|---|
| 4,101,513 A | 7/1978 | Fox et al. |
| 4,185,009 A | 1/1980 | Idel et al. |
| 4,395,463 A | 7/1983 | Kray |
| 5,041,313 A | 8/1991 | Patel |
| 5,235,026 A | 8/1993 | Wulff et al. |
| 5,288,778 A | 2/1994 | Schmitter et al. |
| 5,367,044 A | 11/1994 | Rosenquist |
| 5,391,795 A | 2/1995 | Pickett |
| 5,821,380 A | 10/1998 | Holderbaum et al. |
| 5,869,185 A | 2/1999 | Bahr et al. |
| 5,883,165 A | 3/1999 | Kröhnke et al. |
| 6,228,973 B1 | 5/2001 | McCloskey et al. |
| 6,350,512 B1 | 2/2002 | Hurley et al. |
| 6,586,556 B2 | 7/2003 | Kratschmer et al. |
| 6,613,869 B1 | 9/2003 | Horn et al. |
| 7,351,474 B2 | 4/2008 | Etzrodt et al. |
| 7,425,358 B2 | 9/2008 | Heuer et al. |
| 7,442,430 B2 | 10/2008 | Buckel et al. |
| 7,547,755 B2 | 6/2009 | Heuer |
| 7,985,008 B2 | 7/2011 | Kaisser et al. |
| 8,968,610 B2 | 3/2015 | Meyer et al. |
| 2003/0034491 A1 | 2/2003 | Lempkowski et al. |
| 2009/0093589 A1 | 4/2009 | Bruchmann et al. |
| 2012/0157587 A1 | 6/2012 | Meyer et al. |
| 2014/0322509 A1 | 10/2014 | Meyer et al. |
| 2015/0368434 A1 | 12/2015 | Meyer et al. |
| 2016/0046838 A1 | 2/2016 | Meyer et al. |
| 2016/0291134 A1* | 10/2016 | Droz ..................... G01S 7/4817 |
| 2017/0291400 A1 | 10/2017 | Brambrink et al. |

FOREIGN PATENT DOCUMENTS

| | | |
|---|---|---|
| CN | 105400189 A | 3/2016 |
| DE | 1031512 B | 6/1958 |
| DE | 2500092 A1 | 7/1976 |

(Continued)

OTHER PUBLICATIONS

Abschrift und Screenshot der Prasentation van Dr. Eckhard Wenz (Head of Technology, Global Marketing Mobility Polycarbonates, Covestro) auf der K Messe 2016, 1 page.
Beruhrungsloses Oem Sensorelement 2 PWM Touchless Oem Sensor Module 2 PWM, AR1910-2, 001-002-01-03, 2011, 8 pages.
Evonik Kraft Fur Neues plexiglass, 8 pages.
Gail Overton, Lasers for Lidars: Application Parameters Dictate Laser Source Selection in Lidar Systems, Mar. 14, 2017, 8 pages.
Gotzig et al., Automotive lidar (book), 2016, pp. 405-430.

(Continued)

*Primary Examiner* — Doris L Lee
(74) *Attorney, Agent, or Firm* — Faegre Drinker Biddle & Reath LLP

(57) ABSTRACT

The invention relates to a vehicle utilizing a LiDAR sensor system for driver assistance systems. A composition consisting of a thermoplastic material based on polycarbonate, polyester carbonate and/or polymethylmethacrylate is used here for forming a cover for the sensor against the surroundings.

15 Claims, 1 Drawing Sheet

(56) References Cited

FOREIGN PATENT DOCUMENTS

| | | | |
|---|---|---|---|
| DE | 2804283 A1 | 8/1978 | |
| DE | 3121385 A1 | 8/1982 | |
| DE | 4240313 A1 | 6/1994 | |
| DE | 19943642 A1 | 3/2001 | |
| DE | 10057165 A1 | 5/2002 | |
| DE | 102006022925 A1 | 11/2007 | |
| EP | 0500496 A1 | 8/1992 | |
| EP | 0517044 A2 | 12/1992 | |
| EP | 0570165 A2 | 11/1993 | |
| EP | 0839623 A1 | 5/1998 | |
| EP | 1308084 A1 | 5/2003 | |
| EP | 1506249 A1 | 2/2005 | |
| EP | 1582549 A1 | 10/2005 | |
| EP | 1772667 A2 | 4/2007 | |
| EP | 2950117 A1 | 12/2015 | |
| EP | 3099731 A1 | 12/2016 | |
| GB | 2287817 A | 9/1995 | |
| JP | 2003004942 A | 1/2003 | |
| KR | 10-2010-0123986 A | 11/2010 | |
| WO | WO-9615102 A2 | 5/1996 | |
| WO | WO-2002026862 A1 | 4/2002 | |
| WO | WO-03095521 A1 | 5/2003 | |
| WO | WO-2005113639 A1 | 12/2005 | |
| WO | WO 2006/094624 | * | 9/2006 |
| WO | WO-2006108520 A1 | 10/2006 | |
| WO | WO-2007131491 A2 | 11/2007 | |
| WO | WO-2007135032 A2 | 11/2007 | |
| WO | WO-2008037364 A1 | 4/2008 | |
| WO | WO-2008071363 A2 | 6/2008 | |
| WO | WO-2008109072 A1 | 9/2008 | |
| WO | WO-2008127752 A2 | 10/2008 | |
| WO | WO 2008/0149093 | * | 12/2008 |
| WO | WO-2008149093 A1 | 12/2008 | |
| WO | 2012/080397 A2 | 6/2012 | |
| WO | WO-2012080395 A1 | 6/2012 | |
| WO | 2012/153309 A2 | 11/2012 | |
| WO | 2013/079477 A1 | 6/2013 | |
| WO | 2014/095981 A1 | 6/2014 | |
| WO | WO-2014095967 A1 | 6/2014 | |
| WO | WO-2015113916 A1 | 8/2015 | |
| WO | WO-2016037865 A1 | 3/2016 | |
| WO | 2016/164131 A1 | 10/2016 | |

OTHER PUBLICATIONS

Jang et al., "Design fa ctor optimization of 3d flash lidar sensor Based on geometrical model for automated vehicle And a dvanced driver assista n ce system a pplications," International Journal of Automotive Technology, vol. 18, No. 1, (2017), pp. 147-156.
Makrolon (Registered )2405 and 2407, Bayer Material Science, Mar. 19, 2018, 11 pages.
Material properties of plastics, 2011, 68 pages.
Optical Properties of Makrolon (Registered) and Apec (Registered) for Non-Imaging Optics, 2017, 28 pages.
Ort, Datum, Eidesstattliche Erklarung, Affidavit, 2021, 2 pages.
Plexiglas (Registered) 8N Schwarz 90114, 2015, 1 pages.
Polycarbonate-Blends in Automotive, Bayers Material Science, 74 pages.
Rosemarie Atahl, Automotive Designing the electric car of the future, Mar. 27, 2017, 4 pages.
Rosemarie Atahl, Designin the Electric Car of the Future, Mar. 27, 2017, 3 pages.
Rosemarie Stahl, Designing the Elediic Car of the Future, Mar. 27, 2017, 4 pages.
Under Standing Covestro Colour numbers, Jul. 2016, 2 pages.
International Search Report for PCT/EP2018/060306 dated Jul. 9, 2018.
Written Opinion of the International Searching Authority for PCT/EP2018/060306 dated Jul. 9, 2018.

* cited by examiner

LASER BEAM-PERMEABLE SUBSTRATE MATERIAL FOR USE ON SENSORS

CROSS-REFERENCE TO RELATED APPLICATIONS

This application is a national stage application (under 35 U.S.C. § 371) of PCT/EP2018/060306, filed Apr. 23, 2018, which claims benefit of European Application 17167701.6, filed Apr. 24, 2017, both of which are incorporated herein by reference in their entirety.

The invention relates to a vehicle comprising a LiDAR sensor which emits laser pulses having a wavelength in the range from 800 nm to 2500 nm and a cover for this LiDAR sensor made of a thermoplastic composition. The invention further relates to the use of a molding having a substrate layer comprising a region made of a thermoplastic composition for partial or complete covering of a LiDAR sensor which emits laser pulses having a wavelength in the range from 800 nm to 2500 nm for scanning the surroundings.

Component parts based on thermoplastic material offer many advantages over conventional materials such as for example glass for use in the automotive sector. These include for example elevated fracture resistance and/or weight reduction which in the case of automobiles allow greater occupant safety in road traffic accidents and lower fuel consumption. Finally materials containing thermoplastic polymers allow substantially greater design freedom on account of their easier moldability.

Driver assistance systems such as emergency brake assistants, lane departure warning systems, traffic sign recognition systems, adaptive speed control systems and distance control are known and are employed in current vehicles. To implement the recited functions, surroundings detection sensors generally based on radar, LiDAR and camera sensors are employed. The substrate materials described in the present invention are suitable in particular for LiDAR sensors.

LiDAR (short for light detection and ranging) or else LaDAR (laser detection and ranging) is a method for optical distance and velocity measurement that is related to radar. Laser beams are used instead of the radiowaves in radar.

In the field of driver assistance systems radar sensors especially have become established for adaptive cruise control (ACC) for example. Further systems such as lane departure assistants, traffic jam assistants, blind spot monitoring, junction assistants and pre-crash sensor systems require sensors which while ensuring a large horizontal detection zone (up to 180°) also have a good angular resolution, provide close range coverage <20 m, have a high data repeat rate and are cost-effective to produce. LiDAR sensor systems lend themselves to these applications.

It is an object of the present invention to provide a vehicle/an apparatus for a vehicle comprising a combination of a LiDAR sensor operating in a wavelength range of 800 to 2500 nm and a suitable cover made of a thermoplastic substrate material which is employed for surroundings monitoring of vehicles.

Since thermoplastic materials are generally permeable to IR radiation these should in principle be suitable for such sensor systems. Surprisingly, however, most conventional thermoplastics employed in automotive exteriors are not suitable for such sensors. It was thus shown that even low wall thicknesses of less than 1 mm are sufficient for many thermoplastics to markedly reduce the signal strength of a LiDAR sensor such that they are unsuitable for such systems. These include for example polyolefins, polyamides, ABS, PC/ABS blends and further thermoplastic materials commonly employed in automotive exteriors. This was surprising and not derivable from the available prior art. However, specifically covers made of dark, colored material were of interest since the LiDAR sensor might be able to be concealed behind them.

The prior art describes various thermoplastic systems which in principle exhibit a permeability to electromagnetic waves.

CN 105400189 A describes a laser beam-permeable opaque substrate material based on a polyurethane-polyester system. Special colorant combinations are specified which are suitable for these polyurethane-polyester-based systems and for laser beams. Such compositions are suitable in particular for laser welding. Substrate materials based on polycarbonate are not described. Sensor-suitable substrate materials are likewise not described.

WO 2016/037865 A1 describes automotive exterior parts having a glasslike appearance. Substrate materials suitable for LiDAR systems are not described here.

WO 2008/12775 A1 describes radar sensors for automotive applications. However, these sensors operate in the range from 20-25 GHz and do not allow conclusions to be drawn about suitable substrate materials for laser-assisted systems in the IR region.

WO 2008/149093 A1 describes laminated and pigmented glass systems suitable inter alia for LiDAR sensors. It was shown that the pigments in a polycarbonate composition significantly hamper laser beam permeability. A solution for polycarbonate-based substrate materials therefore cannot be derived from this document.

WO 2007/131491 A2 describes vehicle component parts comprising concealed sensors. This application describes the construction of such component parts, in particular the holder for the sensors. Special compositions for polycarbonate-containing substrate materials are not described.

EP 1772667 A2 describes plastics component parts comprising concealed light elements. The plastics component part here conceals the light element but is transparent or semitransparent to the relevant radiation. To achieve this the substrate contains effect pigments. Such pigments are unsuitable for laser-assisted systems since they result in scattering.

JP 2003-004942 A describes multilayer articles consisting of various plies of materials having a differing refractive index. These systems are permeable to IR radiation. However, markedly higher demands are placed on materials for covers for laser-assisted IR sensors. No laser-assisted sensors are described.

US 2016/0291134 A1 reports on the use of LiDAR sensors in the automotive sector for autonomous/semiautonomous driving. This document does not elaborate on suitable substrate materials for covering or housing LiDAR sensors.

Accordingly, the prior art describes IR radiation-permeable systems made of thermoplastic substrates. Such substrates are suitable for example for infrared cameras or for laser welding. However, no teaching for action arises therefrom since laser-assisted sensor systems operating in the IR range have a markedly elevated sensitivity. Thus the slightest scattering results in errors in the sensor system and thus makes corresponding substrate materials unusable. It was further shown that a multiplicity of substrate materials exhibiting a permeability to IR radiation are not suitable for LiDAR sensors. Furthermore, the prior art certainly does not elaborate on precise polycarbonate compositions and those skilled in the art are therefore unable to obtain any information therefrom to provide polycarbonate-containing substrate materials suitable for LiDAR sensors.

Opaque thermoplastic materials, in particular those based on aromatic polycarbonate, employable for motor vehicle, rail vehicle and aircraft exterior parts etc. and suitable for surroundings monitoring for vehicles via LiDAR sensors are thus not described.

Motor vehicle exterior parts made of thermoplastic material employed in motor vehicle, rail vehicle and aircraft sectors or in the infrastructure sector should also ideally have a long service life and not undergo embrittlement during said service life, i.e. they should have the greatest possible weathering stability. The colour and surface (gloss effect) too should as far as possible undergo only slight changes. The thermoplastic parts should also ideally exhibit sufficient scratch resistance.

It is accordingly an object of the present invention to provide corresponding vehicles which comprise a combination for surroundings monitoring of a suitable cover made of a suitable thermoplastic substrate material and a LiDAR sensor that operates in the IR range from 800 nm to 2500 nm. It is further intended that ideally at least one of the further above-mentioned requirements be fulfilled/disadvantages be overcome.

It has now been found that, surprisingly, the object is achieved by a
system comprising
a) a LiDAR sensor which emits laser pulses having a wavelength in the range from 800 to 2500 nm and
b) a cover partially or completely surrounding the LiDAR sensor having a substrate layer comprising a region made of a thermoplastic composition based on aromatic polycarbonate, polyester carbonate or polymethyl methacrylate,
wherein the composition has a light transmission in the range from 380 to 780 nm of less than 25.0%, preferably up to 20%, more preferably less than 5.0%, particularly preferably less than 1.0%, very particularly preferably of less than 0.1%, determined at a layer thickness of 4 mm according to DIN ISO 13468-2:2006 (D65, 10°),
and the region of the substrate layer made of the thermoplastic composition in its respective thickness has a permeability to IR radiation in the range from 800 nm to 2500 nm of at least 40%, preferably at least 45%, particularly preferably at least 50% and especially preferably greater than 55%, determined according to DIN ISO 13468-2:2006 (based on this standard, recited wavelength range used),
or by a vehicle comprising such a system.

"System" is used here not only in the narrow sense of a package of mechanically joined individual parts but also more broadly as a mere combination of individual parts (merely) joined in a functional sense to form a unit. The LiDAR sensor may be installed into the respective vehicle separately and the cover provided for a desired position in the vehicle through which the pulses of the LiDAR sensor are intended to pass. A mechanically joined combination may likewise be concerned.

"Based on" is here to be understood as meaning that the composition contains this polymer as the principle component, preferably in a proportion of at least 70% by weight, preferably at least 80% by weight, more preferably at least 84% by weight, yet more preferably at least 90% by weight, particularly preferably at least 95% by weight, of the respective polymer in each case based on the overall composition of the thermoplastic composition.

"Transmission in the range from 800 nm to 2500 nm" is to be understood here as meaning an average transmission over this range averaged over all wavelengths in this range.

"Cover" or "use for covering" is to be understood as meaning according to the invention that the cover made of or comprising the subregion made of the described thermoplastic composition is used to be placed in front of the LiDAR sensor to protect it against impact, soiling etc. A cover within the meaning of the invention may therefore be a housing which completely or substantially completely—apart from cable ducts etc.—encompasses the LiDAR sensor. Such a combination of housing and LiDAR sensor likewise forms part of the subject matter of the invention in addition to the superordinate system of the vehicle. It will be appreciated that all embodiments and configurations described as preferable also apply to this combination alone. Likewise the cover may however also be only one element placed in front of the LiDAR sensor in the direction of the vehicle outer skin, preferably as the vehicle outer skin. Such a cover is for example a front panel or a bumper, preferably a front panel. According to the invention a front panel is to be understood as meaning a vehicle body part which as part of the outer shell is attached to the vehicle in the front region. This may be a formative constituent of the vehicle front or a design element attached to the front of the vehicle. A "front panel" is further to be understood as meaning for example a replacement for a radiator grille. As a result of new mobility forms, for example electromobility, a radiator grille consisting of a multiplicity of openings is no longer necessary. A front panel is therefore preferably a self-contained front cover or a body part which may comprise only occasional ventilation slots or retains a radiator grill appearance only for design reasons and combines various functions. Such a component part may be seamlessly integrated and thus allows an integrated design between front wings, bonnet and optionally other body parts. The region of the cover made of the thermoplastic composition is the element traversed by the laser pulses of the LiDAR sensor for detection of the surroundings. Covers according to the invention also include side panels, for example door elements, or rear panels, which allow covering of any required lateral sensors or sensors attached at the rear.

"Substrate layer comprising a region made of a thermoplastic composition" is to be understood as meaning that the substantial part of the substrate layer, namely the part arranged in front of the LiDAR sensor, i.e. which covers the LiDAR sensor with respect to the vehicle surroundings, is made of such a thermoplastic composition, i.e. the substrate layer comprises a region made of such a thermoplastic composition, wherein this region is arranged in front of the LiDAR sensor, i.e. in the region through which the signal pulses of the LiDAR sensors are passed. However, the substrate layer may also comprise other subregions made of another thermoplastic composition which does not have the features according to the invention. In the case of a front panel for example these regions may be for headlight covers which are not for example black, i.e. opaque, but rather transparent. Such covers are producible in particular in two-component or multi-component injection molding processes. Likewise the cover may comprise subregions made of different compositions having the features according to the invention. However, it is preferable according to the invention when the substrate layer is made of the thermoplastic composition.

"Up to" is to be understood as including the recited value. "Up to 20%" thus also comprises "20%" and likewise values lying in the rounding range, for example "20.3%".

"Substrate layer in the region made of the thermoplastic composition in its respective thickness has a permeability to IR radiation . . . of" is to be understood as meaning that the IR permeability of the respective molding is to be determined. The actual permeability of the component part to IR radiation in the range from 800 to 2500 nm is considered here.

The described thermoplastic compositions are sufficiently permeable to the laser pulses of the LiDAR sensor.

According to the invention preference is given to a vehicle comprising a) a LiDAR sensor which emits laser pulses having a wavelength in the range from 800 to 2500 nm and b) a cover partially or completely surrounding the LiDAR sensor having a substrate layer comprising a region made of a thermoplastic composition based on aromatic polycarbonate, polyester carbonate and/or polymethyl methacrylate, wherein the composition has a light transmission in the range from 380 to 780 nm of up to 20%, preferably less than 5.0%, more preferably less than 1.0%, yet more preferably less than 0.1%, determined at a layer thickness of 4 mm according to DIN ISO 13468-2: 2006 (D65, 10°)

and wherein the region of the substrate layer made of the thermoplastic composition in its respective thickness has a permeability to IR radiation in the range from 800 nm to 2500 nm of at least 50% determined according to DIN ISO 13468-2: 2006, and wherein the thermoplastic composition contains i) at least 70% by weight of thermoplastic polymer from the group consisting of aromatic polycarbonate, polyester carbonate and/or polymethyl methacrylate, ii) at least one green and/or one blue colorant selected from the group consisting of the colorants of formulae (1), (2a-c), (3), (4a), (4b), (5) and/or (6)

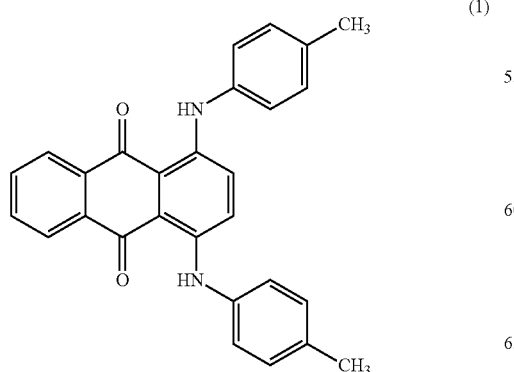

(1)

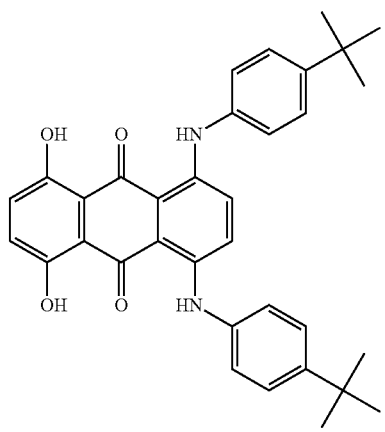

(2a)

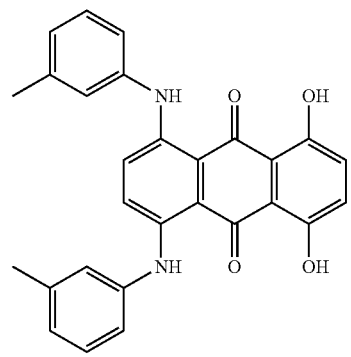

(2b)

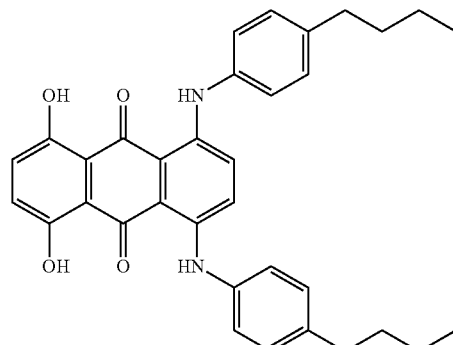

(2c)

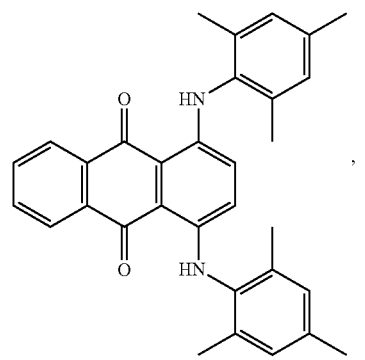

(3)

-continued
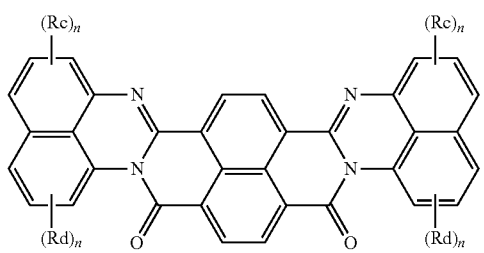
(4a)
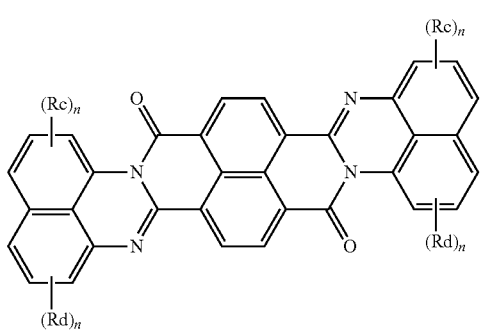
(4b)
wherein
Rc and Rd independently of one another represent a linear or branched alkyl radical or halogen,
n independently of the respective R represents an integer between 0 and 3, wherein the radical for n=0 is hydrogen,
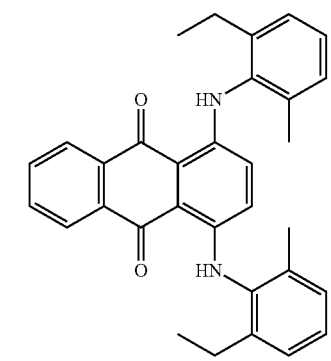
(5)
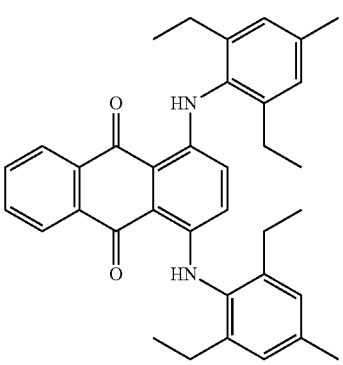
(6)
and
iii) at least one red and/or violet colorant selected from the group consisting of the colorants of formulae (7), (8), (9), (10), (11), (12a), (12b) and/or (13)
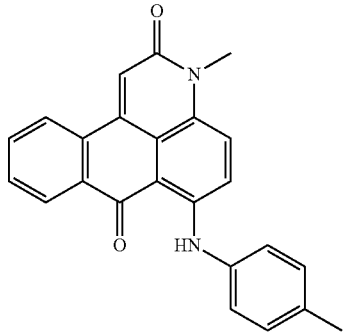
(7)
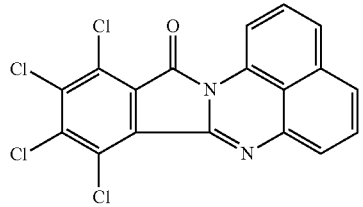
(8)
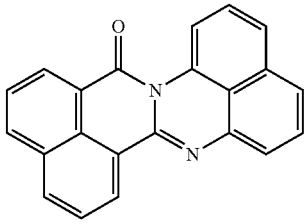
(9)
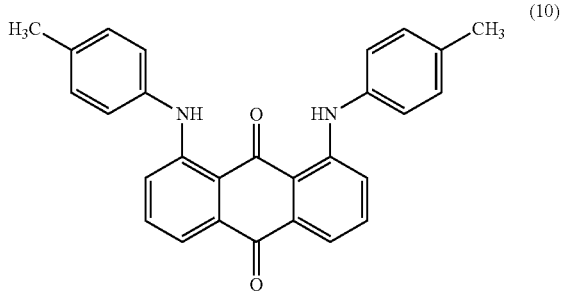
(10)
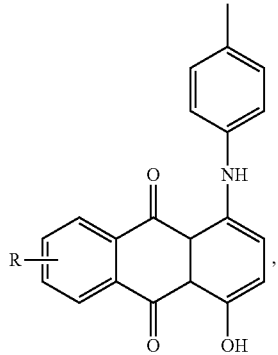
(11)

wherein R is selected from the group consisting of H and p-methylphenylamine radical,

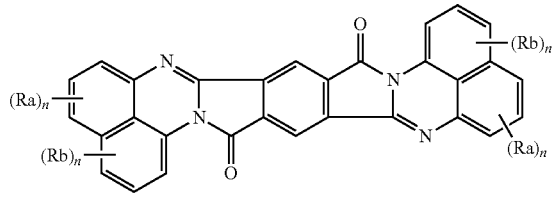
(12a)

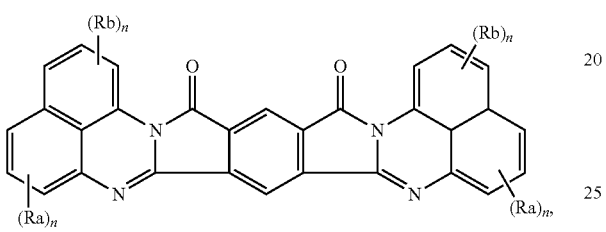
(12b)

wherein

Ra and Rb independently of one another represent a linear or branched alkyl radical or halogen, n independently of the respective R represents an integer between 0 and 3, wherein the radical for n=0 is hydrogen,

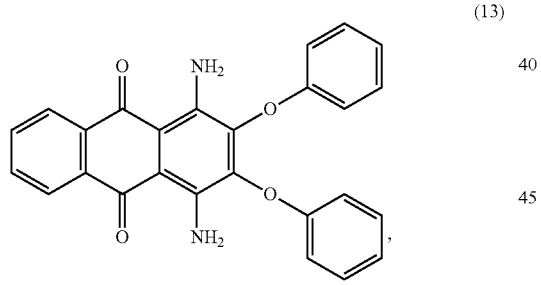
(13)

iv) optionally further colorants selected from the group consisting of the colorants of formulae (14), (15), (16), (17) and/or (18)

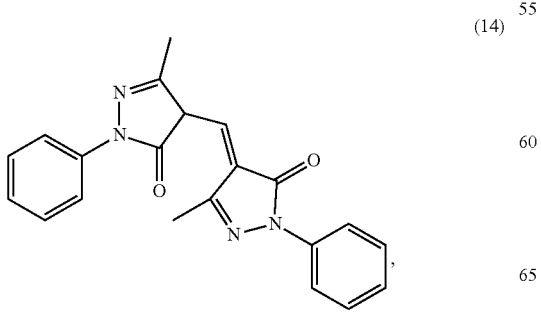
(14)

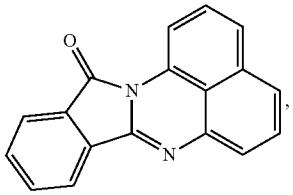
(15)

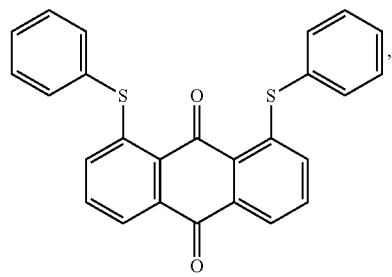
(16)

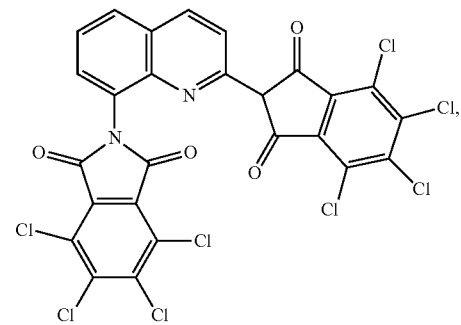
(17)

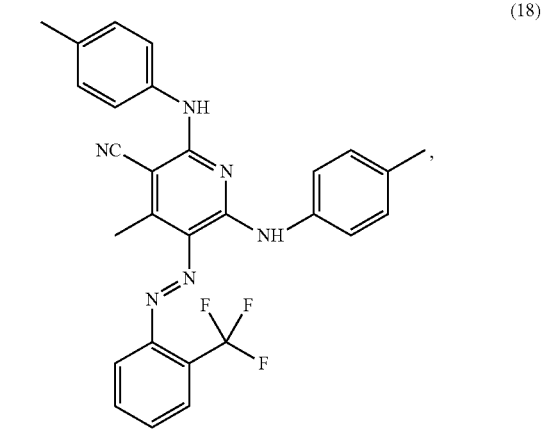
(18)

and 0% to less than 30.0% by weight, preferably less than 20.0% by weight, more preferably less than 10.0% by weight, particularly preferably less than 5.0% by weight, of further thermoplastic polymers and 0% to less than 0.02% by weight, preferably less than 0.0005% by weight, of carbon black, less than 0.1% by weight of further colorants—colorants distinct from the colorants of groups ii) to iv)—and less than 0.1% by weight of titanium dioxide, preferably less than 0.1% by weight of white pigment altogether, wherein the sum of the colorants ii), iii) and optionally iv) in the thermoplastic composition is >0.005% by weight, preferably >0.05% by weight, and wherein the thickness of the region of the substrate layer made of the thermoplastic composition is 1.0 to 7.0 mm, preferably 1.5 to 6.0 mm, more preferably 2 to 4 mm, particularly preferably 2.0 to 4.0 mm.

Particular preference is given to a vehicle comprising a) a LiDAR sensor which emits laser pulses having a wavelength in the range from 800 to 2500 nm and b) a cover partially or completely surrounding the LiDAR sensor having a substrate layer and optionally a protective layer, in particular a scratch resistant coating, wherein the substrate layer comprises a region made of a thermoplastic composition having a light transmission in the range from 380 to 780 nm of less than 5.0%, more preferably less than 1.0%, yet more preferably less than 0.1%, determined at a layer thickness of 4 mm according to DIN ISO 13468-2: 2006 (D65, 10°), and wherein the region of the substrate layer made of the thermoplastic composition in its respective thickness has a permeability to IR radiation in the range from 800 nm to 2500 nm of at least 50% determined according to DIN ISO 13468-2:2006, and the thermoplastic composition consists of i) at least 85% by weight, more preferably at least 95% by weight, of thermoplastic polymer from the group consisting of aromatic polycarbonate, polyester carbonate and/or polymethyl methacrylate, more preferably aromatic polycarbonate, ii) at least one green and/or one blue colorant selected from the group consisting of the colorants of formulae (1), (2a-c), (3), (4a), (4b), (5) and/or (6)

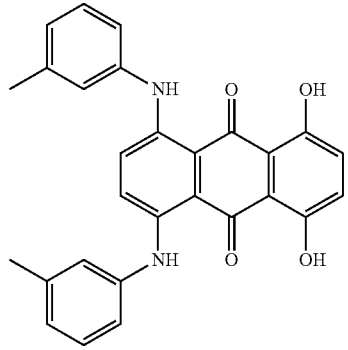
(2b)

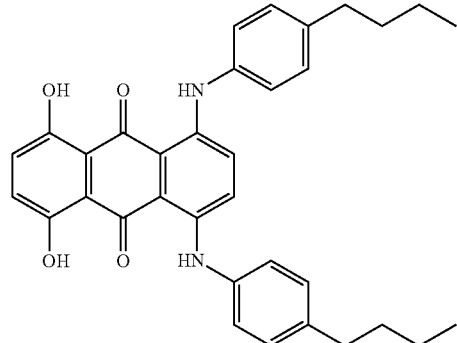
(2c)

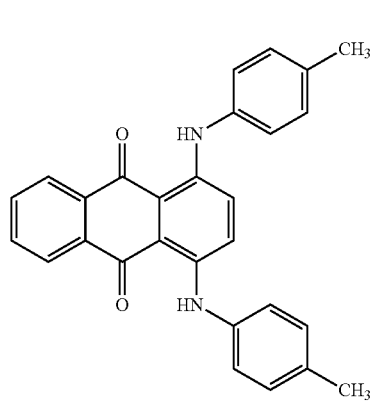
1)

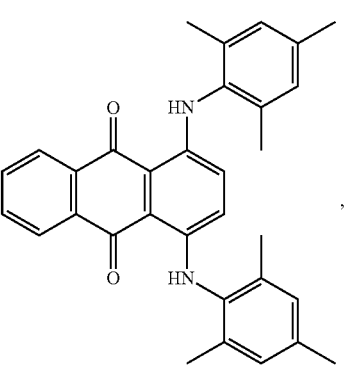
(3)

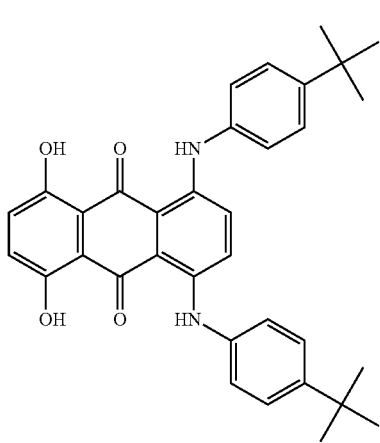
(2a)

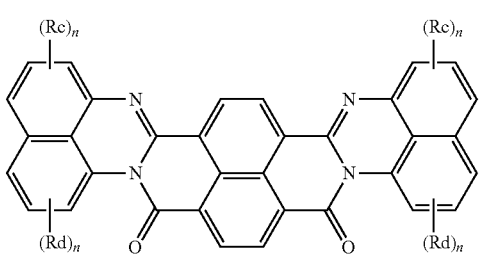
(4a)

-continued
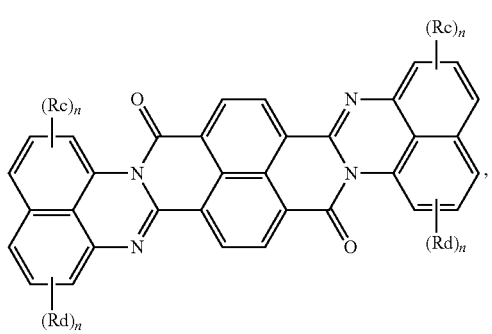
(4b)
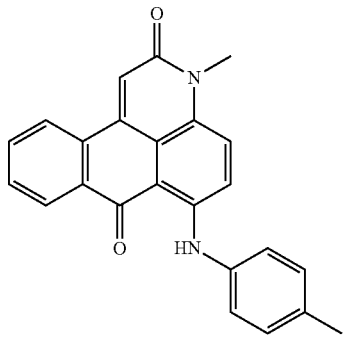
(7)
wherein
Rc and Rd independently of one another represent a linear or branched alkyl radical or halogen,
n independently of the respective R represents an integer between 0 and 3, wherein the radical for n=0 is hydrogen,
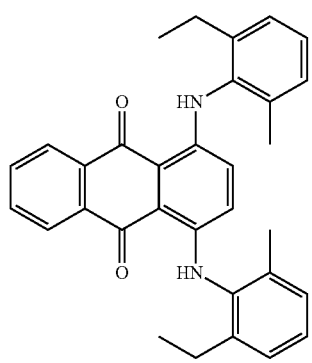
(5)
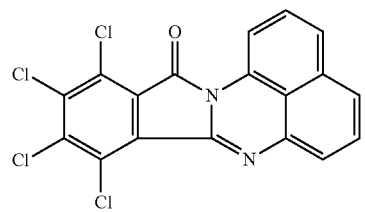
(8)
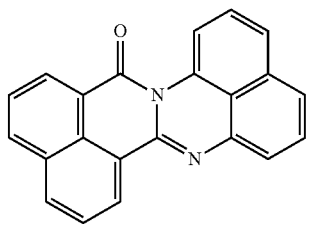
(9)
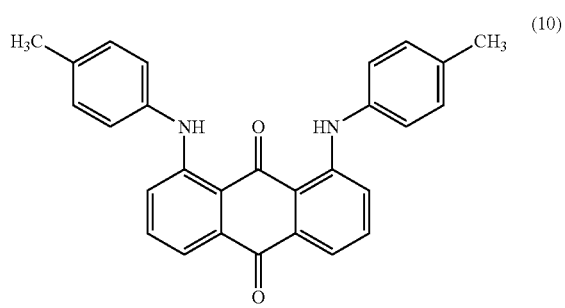
(10)
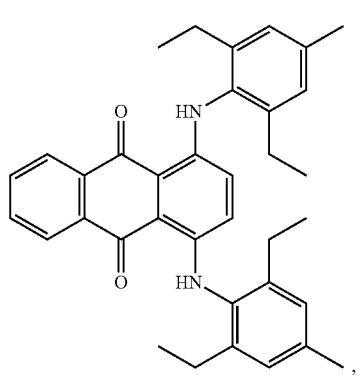
(6)
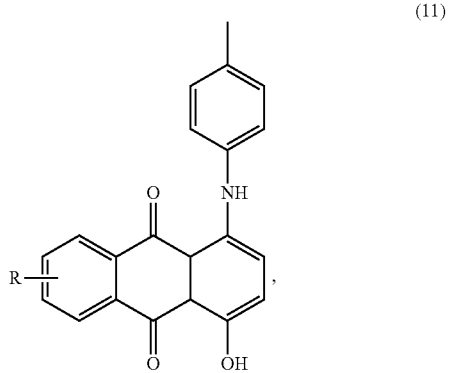
(11)
and
iii) at least one red and/or violet colorant selected from the group consisting of the colorants of formulae (7), (8), (9), (10), (11), (12a), (12b) and/or (13)

wherein R is selected from the group consisting of H and p-methylphenylamine radical,

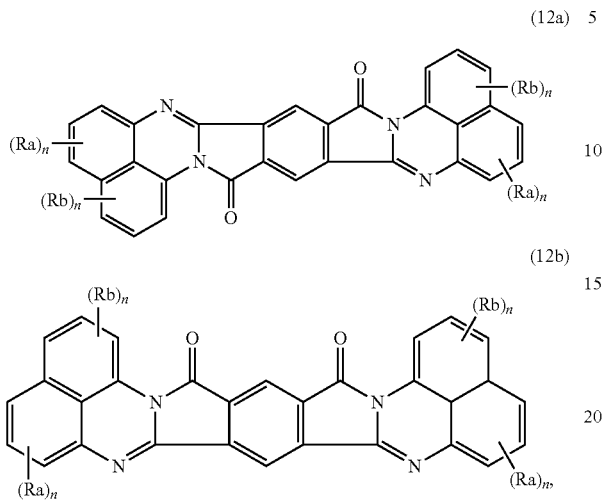

(12a)

(12b)

wherein
Ra and Rb independently of one another represent a linear or branched alkyl radical or halogen,
n independently of the respective R represents an integer between 0 and 3, wherein the radical for n=0 is hydrogen,

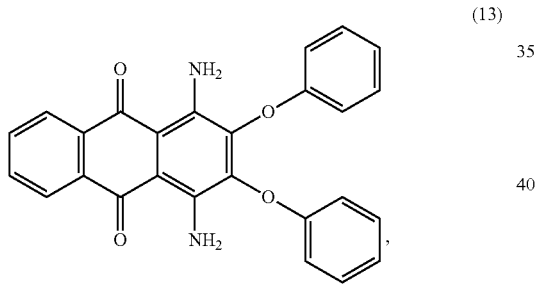

(13)

iv) optionally further colorants selected from the group consisting of the colorants of formulae (14), (15), (16), (17) and/or (18),
v) optionally heat stabilizers, mold release agents, UV absorbers, flame retardants, antistats and/or flow enhancers, preferably in an amount of 0% to 10% by weight, more preferably 0% to 3% by weight,
vi) 0% to less than 30.0% by weight, more preferably 0% to less than 5.0% by weight, of further thermoplastic polymers,
vii) 0% to less than 0.02% by weight, more preferably less than 0.0005% by weight, of carbon black,
less than 0.1% by weight of further colorants—distinct from the colorants of groups ii) to iv)—and less than 0.1% by weight of white pigment,
wherein the sum of the colorants ii) to iv) is >0.05% by weight, more preferably ≥0.10% by weight, yet more preferably >0.12% by weight,
and wherein the thickness of the region of the substrate layer made of the thermoplastic composition is 1.0 to 6.0 mm, preferably 2 to 4 mm, more preferably 2.0 to 4.0 mm.

Very particular preference is given to a
vehicle comprising
a) a LiDAR sensor which emits laser pulses having a wavelength in the range from 800 to 2500 nm and
b) a cover partially or completely surrounding the LiDAR sensor having a substrate layer and optionally a protective layer, in particular a scratch resistant coating, wherein the substrate layer comprises a region made of a thermoplastic composition having a light transmission in the range from 380 to 780 nm of less than 0.1% determined at a layer thickness of 4 mm according to DIN ISO 13468-2: 2006 (D65, 10°), and wherein the region of the substrate layer in its respective thickness has a permeability to IR radiation in the range from 800 nm to 2500 nm of at least 50% determined according to DIN ISO 13468-2:2006,
wherein the thermoplastic composition consists of
i) at least 85% by weight, more preferably at least 95% by weight, of thermoplastic polymer from the group consisting of aromatic polycarbonate, polyester carbonate and/or polymethyl methacrylate, more preferably aromatic polycarbonate,
ii) at least one green and/or one blue colorant selected from the group consisting of the colorants of formulae (1), (2a-c), (3), (4a), (4b), (5) and/or (6)

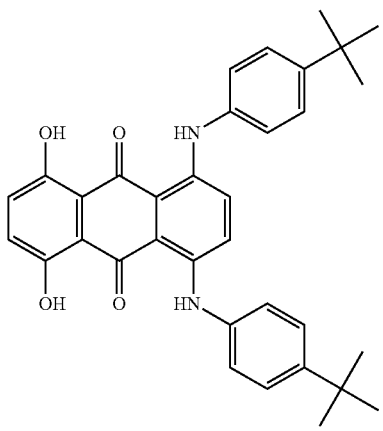

(1)

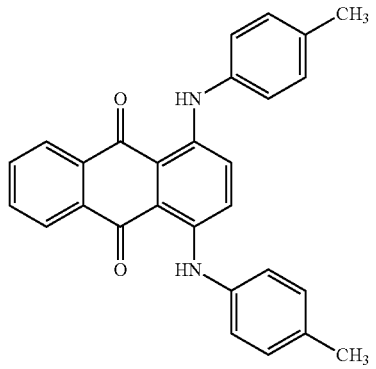

(2a)

-continued
(2b)
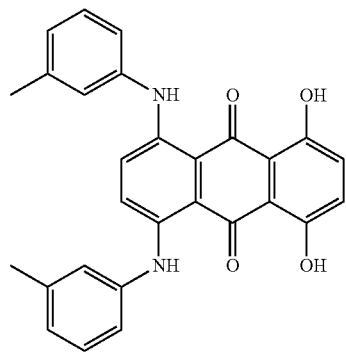
(2c)
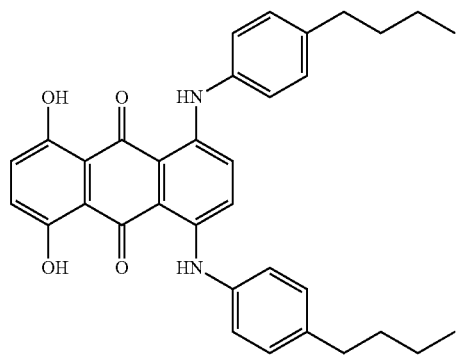
(3)
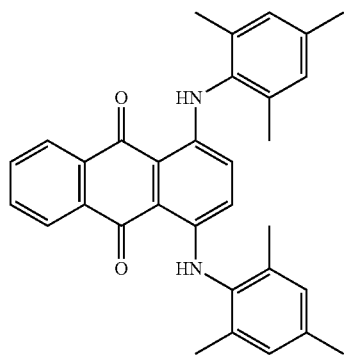
(4a)
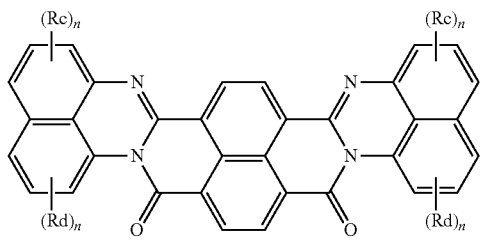
(4b)
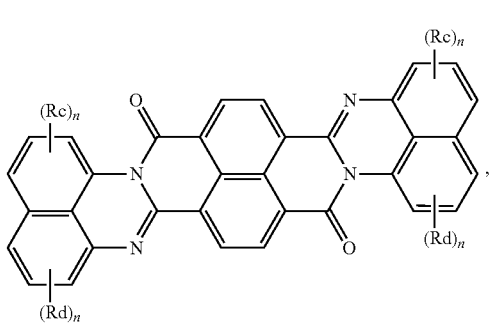
wherein
Rc and Rd independently of one another represent a linear or branched alkyl radical or halogen,
n independently of the respective R represents an integer between 0 and 3, wherein the radical for n=0 is hydrogen.
(5)
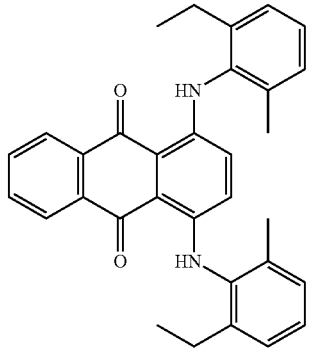
(6)
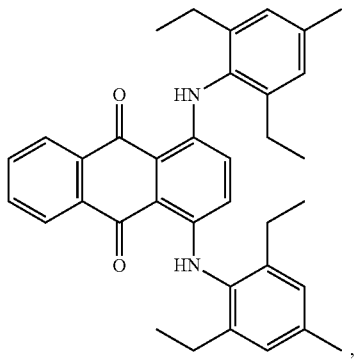
and
iii) at least one red and/or violet colorant selected from the group consisting of the colorants of formulae (7), (8), (9), (10), (11), (12a), (12b) and/or (13)
(7)
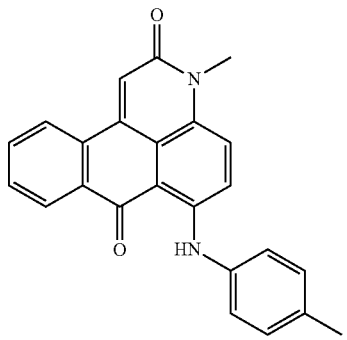
(8)
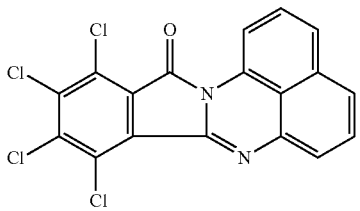

(9)

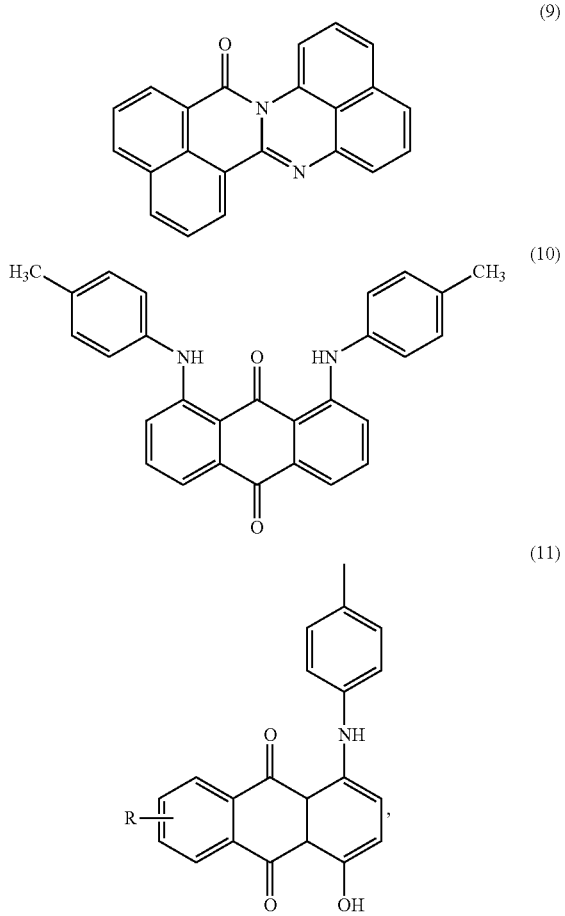

(10)

(11)

wherein R is selected from the group consisting of H and p-methylphenylamine radical, (12a)

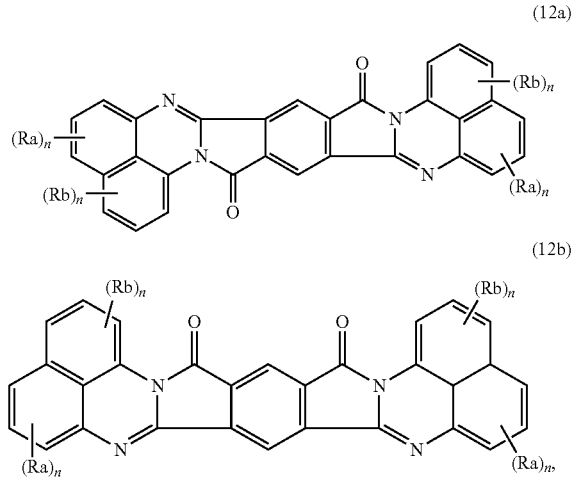

(12b)

wherein
Ra and Rb independently of one another represent a linear or branched alkyl radical or halogen,
n independently of the respective R represents an integer between 0 and 3, wherein the radical for n=0 is hydrogen, (13)

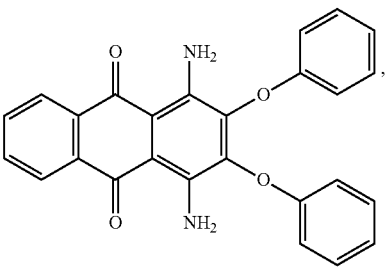

iv) optionally further colorants selected from the group consisting of the colorants of formulae (14), (15), (16), (17) and/or (18), v) optionally heat stabilizers, mold release agents, UV absorbers, flame retardants, antistats and/or flow enhancers, preferably in an amount of 0% to 3% by weight, vi) 0% to less than 30.0% by weight, preferably 0% to less than 5.0% by weight, of further thermoplastic polymers, vii) 0% to less than 0.02% by weight, more preferably 0% to less than 0.0005% by weight, of carbon black, less than 0.1% by weight of further colorants—distinct from the colorants of groups ii) to iv)—and less than 0.1% by weight of titanium dioxide, wherein the sum of the colorants ii) to iv) is >0.10% by weight, yet more preferably >0.12% by weight, and wherein the thickness of the region of the substrate layer made of the thermoplastic composition is 1.0 to 6.0 mm, preferably 2 to 4 mm, more preferably 2.0 to 4.0 mm.

The constitution of the scratch resistant coating is such that it does not significantly reduce the permeability of the cover to the radiation of the LiDAR sensor. "Not significantly" is to be understood as meaning a reduction in intensity of the laser IR radiation in the range from 800 nm to 2500 nm that has passed through the cover determined according to DIN ISO 13468-2:2006 of up to 8%, preferably up to 5%, particularly preferably up to 2%, compared to the same cover without a scratch resistant coating. If instead of or in addition to the scratch resistant coating(s) and additionally to the substrate layer further layers are present, these preferably altogether result, optionally together with one or more scratch resistant coating(s), in a reduction in intensity of the laser IR radiation in the range from 800 nm to 2500 nm that has passed through the cover determined according to DIN ISO 13468-2:2006 of at most up to 8%, preferably up to 5%, particularly preferably up to 2%, compared to the same cover without a scratch resistant coating.

In respect of further preferred embodiments the features described elsewhere apply.

The invention also provides for the use of a molding having a substrate layer comprising a region made of a thermoplastic composition based on aromatic polycarbonate, polyester carbonate or polymethyl methacrylate having a thickness of 1.0 to 7.0 mm, preferably 1.0 to 6.0 mm, wherein the composition has a light transmission in the range from 380 to 780 nm of less than 25.0%, preferably up to 20%, more preferably less than 5.0%, yet more preferably less than 1.0%, particularly preferably less than 0.1%, determined at a layer thickness of 4 mm according to DIN ISO 13468-2: 2006 (D65, 10°), and wherein the region of the substrate layer made of the thermoplastic composition in its respective thickness has a permeability to IR radiation in the range from 800 nm to 2500 nm of at least 50% determined according to DIN ISO 13468-2: 2006 for partially or completely covering a LiDAR sensor which emits laser pulses having a wavelength in the range from 800 to 2500 nm.

It will be appreciated that the feature variants described as preferable for the vehicle likewise apply to the recited use.

It is preferable when the covers, in particular the substrate layer, give a black colour impression. Colored covers are in principle also realizable, i.e. for instance red, green or blue covers.

The covers made of or comprising regions made of the described compositions also exhibit the following positive properties in these regions:
- a glasslike appearance;
- a low weight compared to steel or glass which is important in order to be able to keep the weight of the vehicle as low as possible;
- they meet the requirements in respect of the safety of the vehicle occupants as well as that of other road users, in particular pedestrians, and show in particular sufficient elasticity and deformability but also a low propensity for splintering;
- they make it possible to integrate electrical, electronic, optoelectronic and optical functional elements without noticeably impairing their function both in relation to the vehicle and its occupants and in relation to the external environment;
- they make it possible to cover electrical, electronic, optoelectronic and optical functional elements without noticeably impairing their function both in relation to the vehicle and its occupants and in relation to the external environment;
- they can have an attractive design, in particular have an uninterrupted and seamless design while ideally having been formed in two, preferably in all three, dimensions;
- they may be produced in simple fashion, in particular with the fewest possible manufacturing steps, wherein in particular all manufacturing steps are realizable with integration of at least some of the functional elements in one mold and subsequent attachment and sealing of the functional elements may be omitted;
- they may be subjected to overmolding in regions in front of the LIDAR sensor with the described thermoplastic compositions and in regions not in front of the LiDAR sensor also with other thermoplastic compositions;
- they may have, at least on outward facing parts of the vehicle, an attractive surface which is resistant to environmental influences, for example weathering, but also stone impacts.

Such a cover is moreover very easily producible wherein all manufacturing steps are realizable with integration of the functional elements in one mold and subsequent attachment and sealing of the functional elements may be omitted.

The covering of further functional elements and devices in addition to the LiDAR sensor may be effected, for example of distance sensors as a parking aid for example, motion sensors by means of which for example the bonnet may be opened, lighting strips, headlights, indicators, cameras and displays. As described above, the cover and also the substrate layer may also comprise transparent regions to this end. Furthermore this solution is in principle also suitable for radar-assisted sensors.

According to the invention "vehicle" is to be understood as meaning all means of transport, of goods and/or persons, i.e. landcraft, watercraft and aircraft.

The cover is preferably a molding employed in the front or rear region of a vehicle, for example a bumper, radiator grill, front panel or a rear panel, in particular a front panel for a motor vehicle, but may likewise be a vehicle side element. However the cover may likewise also be a roof or roof module for a motor vehicle. It is particularly preferable when no further elements are present between the cover and the LiDAR sensor along the path of the beam trajectory which could impair the work of the LiDAR sensor.

The LiDAR sensor employed according to the invention emits laser pulses in the range from 800 to 2500 nm, preferably in the range from 820 to 1500 nm, particularly preferably in the range from 850 to 1300 nm, very particularly preferably in the range from 880 nm to 930 nm.

The distance from the LiDAR sensor to the cover is preferably 0.1 to 1000 mm, preferably 1 to 500 mm, more preferably 10 to 300 mm, particularly preferably 50 to 300 mm. The chosen distance is essentially construction related since it should be chosen such that the sensor is sufficiently protected from impact events.

The positioning of the LiDAR sensor is preferably chosen such that the sensor is arranged in the corner regions of the vehicle since in this way the sensor can "see" most.

The substrate layer of the covers described according to the invention in the region of the described thermoplastic compositions, preferably in the entire region of the substrate layer, preferably has a thickness of 1.0 to 7.0 mm, preferably 1.6 to 6.0 mm, particularly preferably a thickness of 2.0 to 4.0 mm. The thickness of the substrate layer in this region is the thickness at the thickest point of the region of the substrate layer made of the thermoplastic composition through which the signal of the LiDAR sensor passes.

The thermoplastic composition is preferably an opaque material, wherein "opaque" is to be understood as meaning a material having a light transmission in the region of 380 to 780 nm, i.e. in the VIS region, of less than 5.0%, preferably less than 1.0%, more preferably less than 0.1%, particularly preferably 0%, determined at a layer thickness of 4 mm according to DIN ISO 13468-2:2006 (D65, 10°). It is preferable when the $T_{DS}$ value determined according to ISO 13837:2008 at a layer thickness of 4 mm is less than 40%. Such materials show no visual transparency, i.e. do not show the background and are perceived as black.

Employed as the thermoplastic polymer for the regions of the substrate layer made of the described composition are aromatic polycarbonate, polyester carbonate and/or polymethyl methacrylate, wherein aromatic polycarbonate is particularly preferred.

In terms of the polyester carbonates preference is given to the types constructed from the raw materials hydroquinone and/or terephthalic acid and/or isophthalic acid. In terms of the aromatic polycarbonates all known aromatic polycarbonates are suitable. This includes homopolycarbonates and copolycarbonates. When in the context of the present invention reference is made anywhere to "polycarbonate", aromatic polycarbonates in particular are meant.

Polycarbonates suitable according to the invention preferably have average molecular weights $M_w$ of 10000 to 50 000 g/mol, more preferably of 14000 to 40 000 g/mol and particularly preferably of 16000 to 32000 g/mol determined by gel permeation chromatography according to DIN 55672-1:2007-08, calibrated against bisphenol A polycarbonate standards using dichloromethane as eluent, calibration with linear polycarbonates (made of bisphenol A and phosgene) of known molar mass distribution from PSS Polymer Standards Service GmbH, Germany, and calibration according to method 2301-0257502-09D (2009 edition in German language) from Currenta GmbH & Co. OHG, Leverkusen. The eluent is dichloromethane. Column combination of crosslinked styrene divinylbenzene resins. Diameter of analytical columns: 7.5 mm; length: 300 mm. Particle sizes of column material: 3 µm to 20 µm. Concentration of solutions: 0.2 wt %. Flow rate: 1.0 ml/min, temperature of solutions: 30° C. Detection using a refractive index (RI) detector.

The polycarbonates are preferably produced by the interfacial process or the melt transesterification process, which have been described many times in the literature.

With regard to the interfacial process reference is made for example to H. Schnell, "Chemistry and Physics of Polycarbonates", Polymer Reviews, Vol. 9, Interscience Publishers, New York 1964 p. 33 et seq., to Polymer Reviews, Vol. 10. "Condensation Polymers by Interfacial and Solution Methods", Paul W. Morgan, Interscience Publishers, New York 1%5, Chapt. VIII, p. 325, to Dres. U. Grigo, K. Kircher und P. R-Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, p 118-145 and also to EP 0 517 044 A1.

The melt transesterification process is described, for example, in the "Encyclopedia of Polymer Science", Vol. 10 (1969), Chemistry and Physics of Polycarbonates, Polymer Reviews, H. Schnell, Vol. 9, John Wiley and Sons, Inc. (1964), and in patent specifications DE 10 31 512 A und U.S. Pat. No. 6,228,973 B1.

The polycarbonates are preferably prepared by reactions of bisphenol compounds with carbonic acid compounds, especially phosgene, or of diphenyl carbonate or dimethyl carbonate in the melt transesterification process.

Particular preference is given here to homopolycarbonates based on bisphenol A and copolycarbonates based on the monomers bisphenol A and 1,1-bis(4-hydroxyphenyl)-3,3,5-trimethylcyclohexane, for example Apec® from Covestro Deutschland AG.

These and further bisphenol/diol compounds employable for polycarbonate synthesis are described inter alia in WO 2008/037364 A1 (page 7, line 21 to page 10, line 5), EP 1 582 549 A1 ([0018] to [0034]), WO 2002/026862 A1 (page 2, line 20 to page 5, line 14) and WO 2005/113639 A1 (page 2, line 1 to page 7, line 20).

The polycarbonates may be linear or branched. It is also possible to use mixtures of branched and unbranched polycarbonates.

Suitable branching agents for the production of branched polycarbonates are known from the literature and described for example in the patent documents U.S. Pat. No. 4,185,009 B and DE 25 00 092 A1 (3,3-bis(4-hydroxyaryl-oxindoles), see whole document in each case), DE 42 40 313 A1 (see page 3, lines 33 to 55), DE 19 943 642 A1 (see page 5, lines 25 to 34) and U.S. Pat. No. 5,367,044 B and in literature cited therein.

Furthermore, the polycarbonates used may also be intrinsically branched, in which case no branching agent is added in the course of polycarbonate preparation. An example of intrinsic branching is that of so-called Fries structures, such as are described for melt polycarbonates in EP 1 506 249 A1.

In addition, it is possible to use chain terminators in the polycarbonate preparation. The chain terminators used are preferably phenols such as phenol, alkylphenols such as cresol and 4-tert-butylphenol, chlorophenol, bromophenol, cumylphenol or mixtures thereof.

In principle the described composition of the substrate layer may contain not only the recited thermoplastic polymers aromatic polycarbonate, polyester carbonate and/or polymethyl methacrylate but also further thermoplastic polymers, i.e., those distinct from aromatic polycarbonate, polyester carbonate and/or polymethyl methacrylate. Such thermoplastic polymers are polystyrene, styrene copolymers, cyclic polyolefin, copolymers comprising styrene, for example transparent polystyrene acrylonitrile (PSAN), thermoplastic polyurethanes, polymers based on cyclic olefins (for example TOPAS®, a commercial product from Ticona), polycarbonate blends comprising olefinic copolymers or graft polymers, for example styrene/acrylonitrile copolymers.

Further thermoplastic polymer may be present only in amounts such that the permeability to the laser pulses of the LiDAR sensor is not disrupted to an extent such that the system loses its functionality. The substrate layer thus contains 0% to less than 30.0% by weight, preferably 0% to less than 20.0% by weight, more preferably 0% to less than 10.0% by weight, particularly preferably 0% to less than 5.0% by weight, very particularly preferably 0% to less than 1.0% by weight, of further thermoplastic polymer, very particularly preferably no further thermoplastic polymer at all. According to the invention "less than" is to be understood as meaning that the respective component may also not be present at all.

The composition contains a green and/or a blue colorant (component ii) and a red and/or violet colorant (component iii): at least one colorant of formulae (1), (2a-c), (3), (4), (5) or (6) (group ii), especially preferably (1), (2a-c), (3) or (4), with at least one colorant selected from the colorants of formulae (7) to (13) (group iii), preferably selected from formulae (7), (11), or (12). Further colorants (component iv) may optionally be employed—especially preferably yellow colorants.

Optional further colorants of group iv are selected from the colorants of the formulae (14) to (18), especially preferably selected from the colorants of formulae (14) and (15).

Green colorants are especially preferably colorants of formulae (1) and (2a/2b/2c):

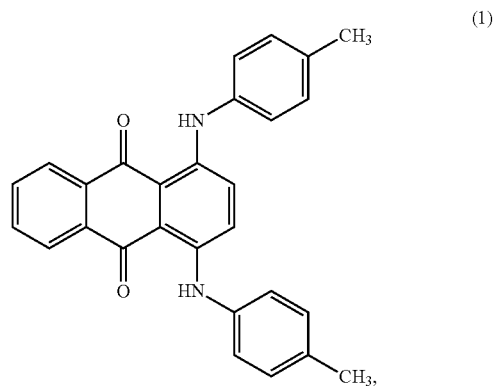 [SMILES: Cc1ccc(Nc2ccc(Nc3ccc(C)cc3)c3c2C(=O)c2ccccc2C3=O)cc1]

-continued

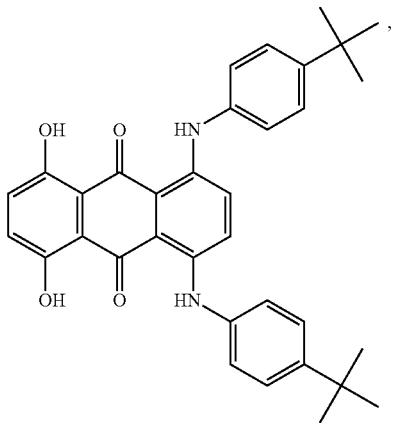
(2a)

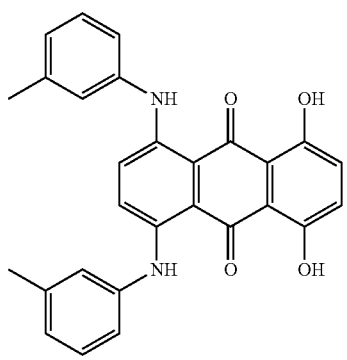
(2b)

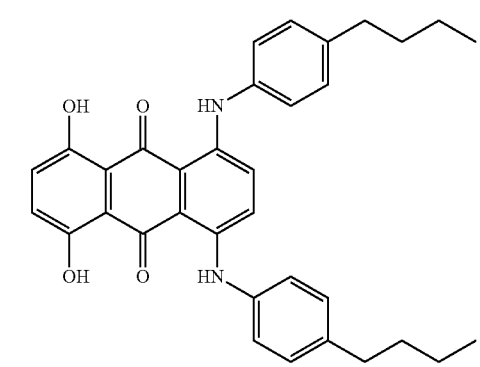
(2c)

The colorant of formula (1) is known under the name Macrolex Green 5B from Lanxess Deutschland GmbH, colour Index number 61565, CAS-Number: 128-90-3, and is an anthraquinone dye.

Colorants of formulae (2a), (2b) and (2c) am known under the name Macrolex Grün G (Solvent Green 28).

Blue colorants employed are preferably colorants of formulae (3) and/or (4a/4b):

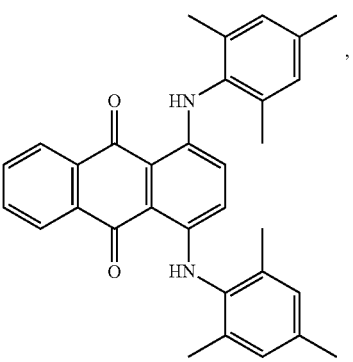
(3)

obtainable under the name "Keyplast Blue KR", CAS-Number 116-75-6,

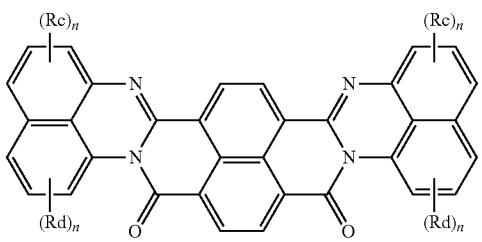
(4a)

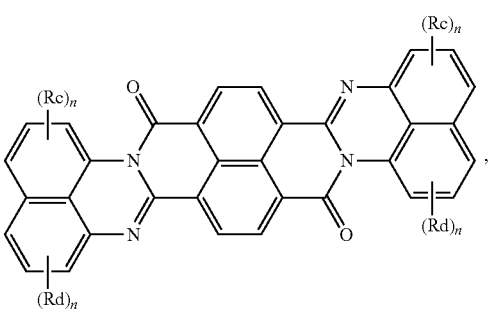
(4b)

wherein

Rc and Rd independently of one another represent a linear or branched alkyl radical or halogen, preferably methyl, ethyl, propyl, isopropyl, butyl, isobutyl, tert-butyl, pentyl, neopentyl, hexyl, thexyl or Cl, more preferably methyl, Cl and particularly preferably Cl, n independently of the respective R represents an integer between 0 and 3, wherein the radical for n=0 is hydrogen, In a preferred embodiment Rc and/or Rd are Cl and are in o- and/or p-positions relative to the carbon atoms bearing the amino functionalities, for example di-orthochloronapthalino, di-ortho, mono-para-chloronaphthalino and mono-ortho-naphthalino. Furthermore in a preferred embodiment Rc and Rd each represent a tert-butyl radical which is preferably in the meta-position relative to the carbon atoms bearing the nitrogen functionalities.

In a particularly preferred embodiment n=0 in all rings, so that all Rc and Rd=H.

Also employable as blue colorants are:

Colorants of formula (5) obtainable under the name "Macrolex Blue 3R Gran"

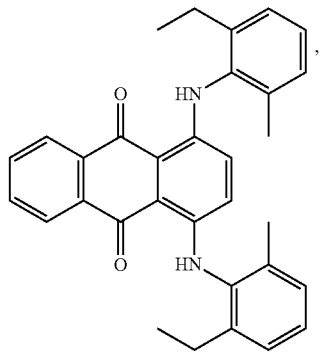

and/or colorants of formula (6) obtainable under the name "Macrolex Blue RR" (CAS 32724-62-2; Solvent Blue 97; C.I. 615290),

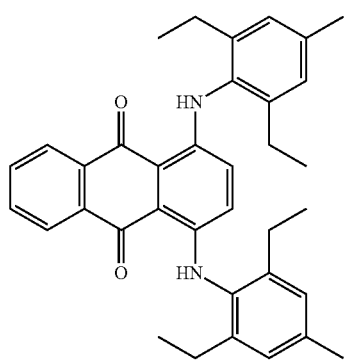

Preferably employed as red colorant is a colorant of formula (7) obtainable under the name "Macrolex Red 5B" having CAS-Number 81-39-0:

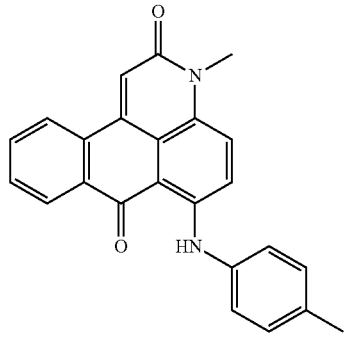

Also employable are colorants of formulae (8) having CAS-Number 71902-17-5 and (9) having CAS-Number 89106-94-5:

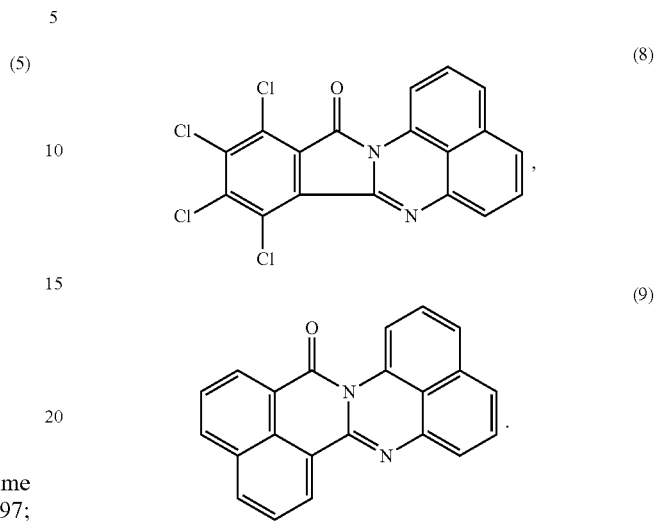

Preferably employed as violet colorants are colorants of formulae (10) having CAS-Number 61951-89-1, (11) obtainable under the name "Macrolex Violet B" from Lanxess AG having CAS-Number 81-48-1 or (12a/12b) obtainable under the name Amaplast Violet PK:

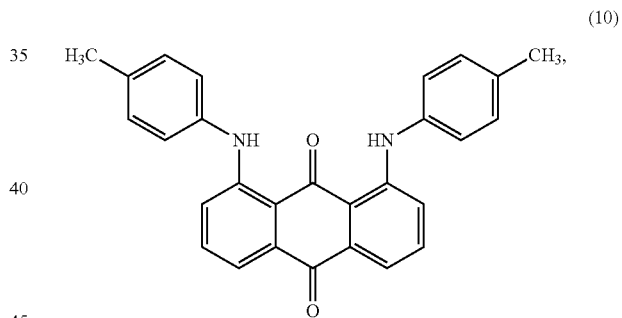

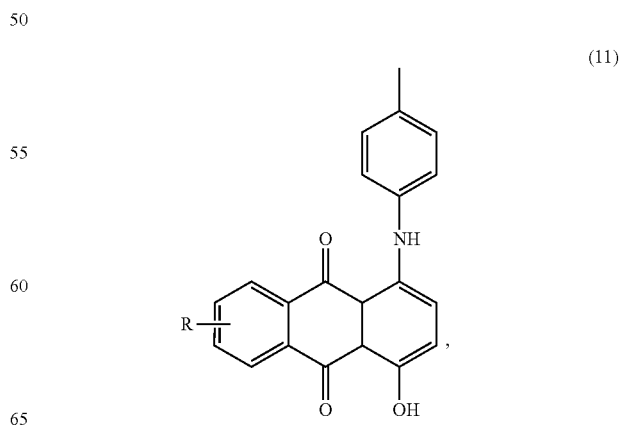

wherein R is selected from the group consisting of H and p-methylphenylamine radical; preferably R=H:

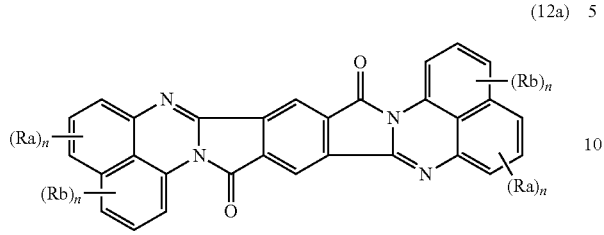
(12a)

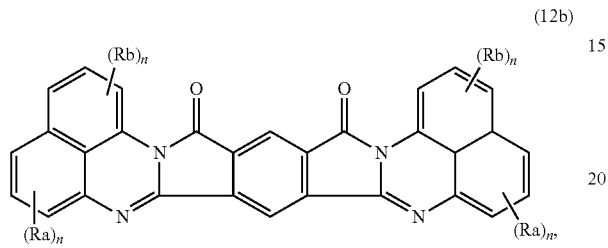
(12b)

wherein
  Ra and Rb independently of one another represent a linear or branched alkyl radical or halogen, preferably methyl, ethyl, propyl, isopropyl, butyl, isobutyl, tert-butyl, pentyl, neopentyl, hexyl, thexyl or Cl, more preferably methyl, Cl and particularly preferably Cl,
  n independently of the respective R represents an integer between 0 and 3, wherein the radical for n=0 is hydrogen, In a preferred embodiment Ra and/or Rb are Cl and are in o- and/or p-positions relative to the carbon atoms bearing the amine functionalities, for example di-orthochloronapthalino, di-ortho, mono-para-chloronaphthalino and mono-ortho-naphthalino. Furthermore in a preferred embodiment Ra and Rb each represent a tert-butyl radical which is preferably in the meta-position relative to the carbon atoms bearing the nitrogen functionalities.

In a particularly preferred embodiment n=0 in all rings, so that all Ra and Rb=H.

Also employable are colorants conforming to formula (13) obtainable under the name "Macrolex RedViolet R", CAS-Number 6408-72-6:

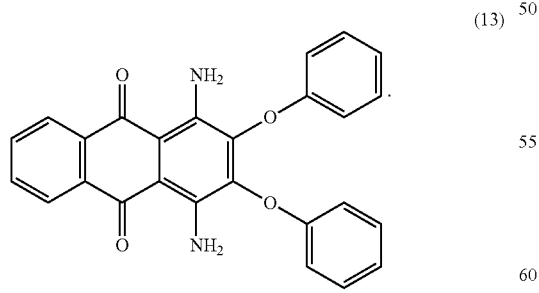
(13)

Preferably employed as yellow colorants are colorants of formulae (14) obtainable under the name "Macrolex Yellow 3G" having CAS-Number 4702-90-3 and/or (15) obtainable under the name "Macrolex Orange 3G" (CAS-Number 6925-69-5, C.I. 564100):

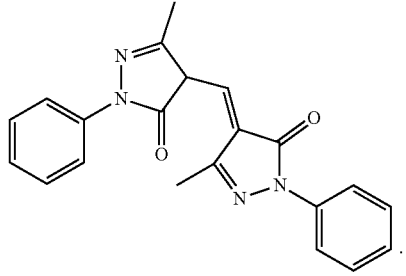
(14)

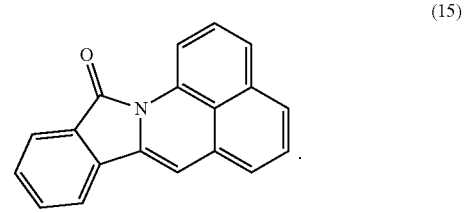
(15)

It is also possible to employ colorants of formulae (16) obtainable under the name "Oracet Yellow 180" having CAS-Number 13676-91-0, (17) having CAS-Nummer 30125-47-4 and/or (18) obtainable under the name "Oracet Orange 220; Solvent Orange 116" having CAS-Number 669005-94-1.

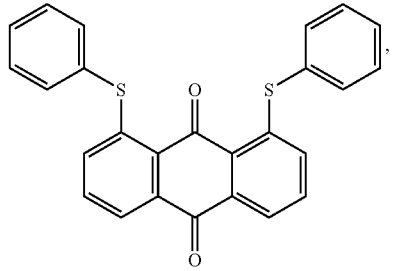
(16)

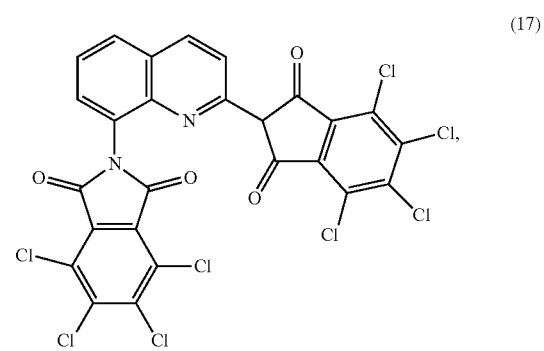
(17)

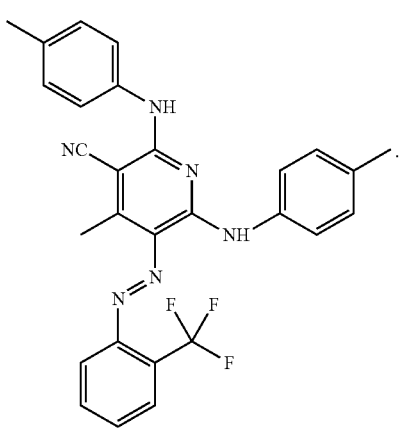
(18)

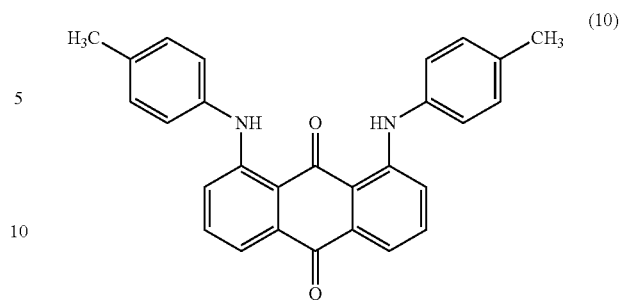
(10)

and Macrolex Green 5B from Lanxess AG (CAS 128-80-3, Solvent Green 3, colour Index number 61565), likewise an anthraquinone colorant:

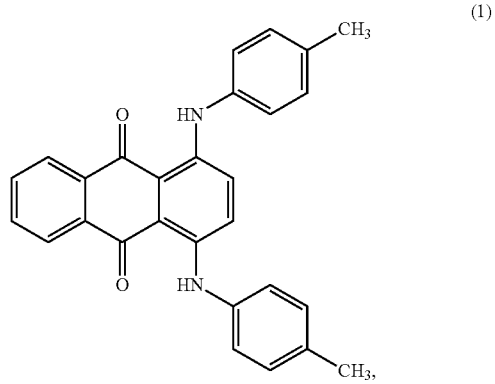
(1)

In addition to the colorants of groups ii), iii) and optionally iv) the composition contains less than 0.1% by weight, more preferably less than 0.05% by weight, of further colorants. The group iv) of "further" colorants consists only of colorants having the structures (14) to (18).

However, in principle further colorants may optionally also be employed in addition to the above-described colorants of groups ii) to iv). These are preferably anthraquinone-based, perinone-based, phthalocyanine-based or are colorants derived from these structures. Particularly preferred colorants are described in WO 2012/080395 A1. Also employable as colorants are Amaplast Yellow GHS (CAS 13676-91-0; Solvent Yellow 163; C.I: 58840); Keyplast Blue KR (CAS 116-75-6; Solvent Blue 104; C.I. 61568), Heliogen Blue varieties (for example Heliogen Blue K 6911; CAS 147-14-8; Pigment Blue 15:1; C.I. 74160) and Heliogen Green varieties (for example Heliogen Green K 8730; CAS 1328-53-6; Pigment Green 7; C.I. 74260).

However, it is preferable when the colorants of the thermoplastic composition of the subregion(s) of the substrate layer are selected exclusively from the colorants of formulae (1) to (18).

At a light transmission of at least 5% in the range from 380 to 780 nm determined at a layer thickness of 4 mm according to DIN ISO 13468-2: 2006 (D65, 10°) the sum of all colorants is preferably >0.005% by weight, especially preferably >0.01% by weight, based on the overall composition, wherein the total amount of all colorants is preferably <0.05% by weight and in particular <0.04% by weight.

At a light transmission in the range from 380 to 780 nm determined at a layer thickness of 4 mm according to DIN ISO 13468-2: 2006 (D65, 10°) of less than 5%: The sum of all colorants of components ii, iii and iv is >0.05% by weight, preferably >0.08% by weight, more preferably ≥0.10% by weight, particularly preferably >0.11% by weight and very particularly preferably >0.12% by weight based on the overall composition of the substrate material.

The composition particularly preferably contains less than 0.0005% by weight of carbon black, very particularly preferably is free from carbon black.

The recited low transmission is obtained for example for compositions containing the colorant combination Macrolex Violet 3R from Lanxess AG (CAS 61951-89-1, Solvent Violet 36, colour Index number 61102), an anthraquinone colorant:

for example 0.1% by weight in each case of both of these colorants based on the overall composition.

The composition for the substrate layer material should ideally be processable at the temperatures customary for thermoplastics, i.e. at temperatures above 300° C., for example 350° C., without undergoing marked changes in optical properties, for example deep gloss, or mechanical properties during processing.

The compositions which form regions of the substrate layer(s) and are based on a thermoplastic polymer, preferably on aromatic polycarbonate, preferably contain in addition to the colorants one or more further customary additives. Such additives are customary additives described for example in EP-A 0 839 623, WO-A 96/15102, EP-A 0 500 496 or "Plastics Additives Handbook", Hans Zweifel, 5th Edition 2000, Hanser Verlag, Munich, for example mold release agents, UV absorbers, heat stabilizers, flame retardants, antistats and/or flow enhancers.

Here too, the compositions may in principle have added to them that which does not significantly impair the functionality of the sensor system.

The compositions particularly preferably contain less than 0.1% by weight, very particularly preferably the compositions of the substrate layer are free from scattering additives, for example those based on acrylate, polyethylene, polypropylene, polystyrene, glass, aluminium oxide and/or silicon dioxide. Furthermore the composition particularly preferably contains in total less than 0.1% by weight, more preferably less than 0.05% by weight, very particularly preferably is free from, white pigments or the like, for example pigments such as titanium dioxide, kaolin, barium sulfate, zinc sulfide, aluminium oxide, aluminum hydroxide, quartz flour, from interference pigments and/or pearlescent pigments, i.e. platelet-shaped particles such as mica, graphite, talc, $SiO_2$, chalk and/or titanium dioxide, coated and/or uncoated. Furthermore the composition particularly preferably contains in total less than 0.1% by weight, very particularly preferably the composition is free from, nanoparticulate systems such as carbon black, nanotubes, metal particles, metal oxide particles. The composition preferably also contains less than 0.1% by weight, particularly preferably is free from, pigments based on insoluble pigments, such as are described for example in DE 10057165 A1 and in WO 2007/135032 A2.

The composition particularly preferably comprises no flame retardants with the exception of a) mono- and/or oligomeric phosphoric/phosphonic esters, i.e. phosphorus compounds of the general formula (V)

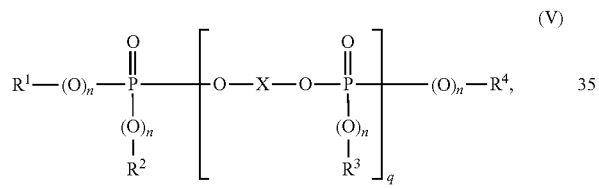

in which $R^1$, $R^2$, $R^3$ and $R^4$ independently of one another represent $C_1$- to $C_8$-alkyl, in each case optionally halogenated and in each case branched or unbranched, and/or $C_5$- to $C_6$-cycloalkyl, $C_6$- to $C_{20}$-aryl or $C_7$- to $C_{12}$-aralkyl, in each case optionally substituted by branched or unbranched alkyl, and/or halogen, preferably chlorine and/or bromine, n independently at each occurrence represents 0 or 1, q represents an integer from 0 to 30 and X represents a mono- or polycyclic aromatic radical having 6 to 30 carbon atoms or a linear or branched aliphatic radical having 2 to 30 carbon atoms, each of which may be substituted or unsubstituted, and bridged or unbridged.

Preferably, $R^1$, $R^2$, $R^3$ and $R^4$ independently of one another represent branched or unbranched $C_1$- to $C_4$-alkyl, phenyl, naphthyl or $C_1$- to $C_4$-alkyl-substituted phenyl. In the case of aromatic $R^1$, $R^2$, $R^3$ and/or $R^4$ groups, these may in turn be substituted by halogen and/or alkyl groups, preferably chlorine, bromine and/or $C_1$- to $C_4$-alkyl, branched or unbranched. Particularly preferred aryl moieties are cresyl, phenyl, xylenyl, propylphenyl and butylphenyl, and also the corresponding brominated and chlorinated derivatives thereof.

X in formula (V) preferably derives from diphenols.

n in formula (V) is preferably 1.

q preferably represents 0 to 20, more preferably 0 to 10, and in the case of mixtures has average values of 0.8 to 5.0, preferably 1.0 to 3.0, more preferably 1.05 to 2.00, and especially preferably of 1.08 to 1.60.

Preferred as a phosphorus compound of general formula V is a compound of formula I:

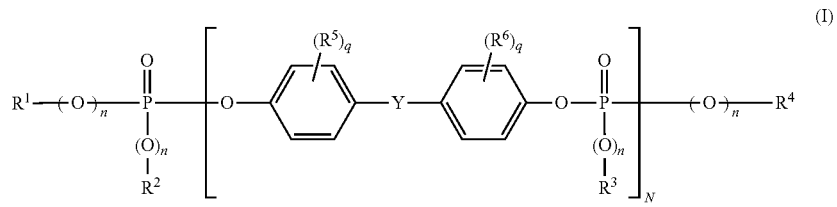

in which $R^1$, $R^2$, $R^3$ and $R^4$ independently of one another represent linear or branched $C_1$- to $C_8$-alkyl and/or optionally linear or branched alkyl-substituted $C_5$- to $C_6$-cycloalkyl, $C_6$- to $C_{10}$-aryl or $C_7$- to $C_{12}$-aralkyl, n independently at each occurrence represents 0 or 1, q independently at each occurrence represents 0, 1, 2, 3 or 4, N represents a number between 1 and 30, $R_5$ and $R_6$ independently of one another represent linear or branched $C_1$- to $C_4$-alkyl, preferably methyl, and Y represents linear or branched $C_1$- to $C_7$-alkylidene, linear or branched $C_1$- to $C_7$-alkylene, $C_5$- to $C_{12}$-cycloalkylene, $C_5$- to $C_{12}$-cycloalkylidene, —O—, —S—, —SO—, $SO_2$ or —CO—.

X in formula V particularly preferably represents

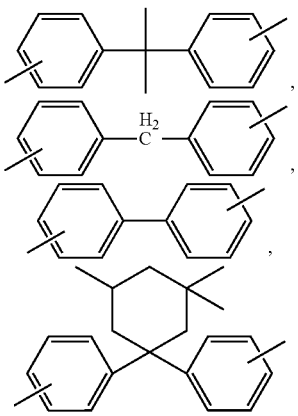

or the chlorinated and/or brominated derivatives thereof. X (together with the adjoining oxygen atoms) preferably derives from hydroquinone, bisphenol A or diphenylphenol. It is likewise preferable when X derives from resorcinol. X particularly preferably derives from bisphenol A.

Phosphorus compounds of the formula (V) are especially tributyl phosphate, triphenyl phosphate, tricresyl phosphate, diphenyl cresyl phosphate, diphenyl octyl phosphate, diphenyl 2-ethylcresyl phosphate, tri(isopropylphenyl) phosphate, resorcinol-bridged oligophosphate and bisphenol A-bridged oligophosphate. The use of oligomeric phosphoric esters of formula (V) which derive from bisphenol A is especially preferred.

Most preferred as component C is bisphenol A-based oligophosphate of formula (Va)

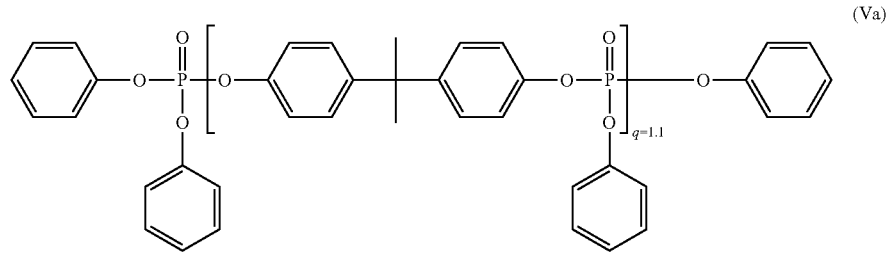

Particular preference is also given to oligophosphates analogous to formula (Va) in which q is between 1.0 and 1.2.

It is preferable to use mixtures of identical structure and different chain length, wherein the stated q value is the average q value. The average q value is determined by determining the composition of the phosphorus compound mixture (molecular weight distribution) by high pressure liquid chromatography (HPLC) at 40° C. in a mixture of acetonitrile and water (50:50) and using this to calculate the average values of q.

It is very particularly preferable when the composition contains no flame retardants and no anti-drip agents.

The compositions particularly preferably contain mold release agents based on a fatty acid ester, preferably based on a stearic ester, especially preferably based on pentaerythritol. It is preferable to employ pentaerythritol tetrastearate (PETS) and/or glycerol monostearate (GMS).

The composition employed for regions of the substrate layer/for the substrate layer optionally further contains an ultraviolet absorber. Suitable UV absorbers are compounds having the lowest possible transmittance below 400 nm and the highest possible transmittance above 400 nm. Such compounds and the production thereof are known from the literature and are described for example in EP 0 839 623 A1, WO 1996/15102 A2 and EP 0 500 496 A1. Ultraviolet absorbers particularly suitable for use in the composition according to the invention are benzotriazoles, triazines, benzophenones and/or arylated cyanoacrylates.

In a particularly preferred embodiment the composition employed for the substrate layer contains UV absorbers.

The following ultraviolet absorbers are suitable for example: Hydroxybenzotriazoles, such as 2-(3',5'-bis(1,1-dimethylbenzyl)-2'-hydroxyphenyl)benzotriazole (Tinuvin® 234, BASF AG. Ludwigshafen), 2-(2'-hydroxy-5'-(tert-octyl)phenyl)benzotriazole (Tinuvin® 329, BASF AG. Ludwigshafen), 2-(2'-hydroxy-3'-(2-butyl)-5'-(tert-butyl) phenyl)benzotriazole (Tinuvin® 350, BASF AG. Ludwigshafen), bis(3-(2H-benzotriazolyl)-2-hydroxy-5-tert-octyl)methane, (Tinuvin® 360, BASF AG. Ludwigshafen), (2-(4,6-diphenyl-1,3,5-triazin-2-yl)-5-(hexyloxy)phenol (Tinuvin® 1577, BASF AG. Ludwigshafen), the benzophenones 2,4-dihydroxybenzophenone (Chimasorb® 22, BASF AG. Ludwigshafen) or 2-hydroxy-4-(octyloxy)benzophenone (Chimasorb® 81, BASF AG. Ludwigshafen), 2-cyano-3,3-diphenyl-2-propenoic acid, 2,2-bis[[(2-cyano-1-oxo-3,3-diphenyl-2-propenyl)oxy]methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (CGX UVA 006, BASF AG. Ludwigshafen) or tetraethyl-2,2'-(1,4-phenylenedimethylidene) bismalonate (Hostavin® BCap, Clariant AG). It is also possible to use mixtures of these ultraviolet absorbers.

The thermoplastic compositions more preferably also contain at least one heat stabilizer/processing stabilizer.

As such, phosphites and phosphonites and also phosphines are preferred. Examples include triphenyl phosphite, diphenyl alkyl phosphite, phenyl dialkyl phosphite, tris (nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,4-di-cumylphenyl) pentaerythritol diphosphite, bis(2,6-di-tert-butyl-4-methylphenyl) pentaerythritol diphosphite, diisodecyloxy pentaerythritol diphosphite, bis(2,4-di-tert-butyl-6-methylphenyl) pentaerythritol diphosphite, bis(2,4,6-tris(tert-butylphenyl)) pentaerythritol diphosphite, tristearyl sorbitol triphosphite, tetrakis(2,4-di-tert-butylphenyl)-4,4'-biphenylenediphosphonite, 6-isooctyloxy-2,4,8,10-tetra-tert-butyl-12H-dibenzo[d,g]-1,3,2-dioxaphosphocine, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenzo[d,g]-1,3,2-dioxaphosphocine, 2,2', 2''-nitrilo[triethyltris(3,3',5,5'-tetra-tert-buty-1,1'-biphenyl-2,2'-diyl) phosphite], 2-ethylhexyl(3,3',5,5'-tetra-tert-butyl-1,1'-biphenyl-2,2'-diyl) phosphite, 5-butyl-5-ethyl-2-(2,4,6-tri-tert-butylphenoxy)-1,3,2-dioxaphosphirane, bis(2,6-di-tert-butyl-4-methylphenyl)pentaerythritol diphosphite, triphenylphosphine (TPP), trialkylphenylphosphine, bisdiphenylphosphinoethane or a trinaphthylphosphine. Especially preferably employed are triphenylphosphine (TPP), Irgafos® 168 (tris(2,4-di-tert-butylphenyl) phosphite) or tris (nonylphenyl) phosphite or mixtures thereof. Also employable are alkyl phosphates, for example mono-, di- and trihexyl phosphate, triisoctyl phosphate and trinonylphosphate.

Also employable are phenolic antioxidants such as alkylated monophenols, alkylated thioalkylphenols, hydroquinones and alkylated hydroquinones. Particularly preferably employed are Irganox 1010 (pentaerythritol-3-(4-hydroxy-3,5-di-tert-butylphenyl) propionate; CAS: 6683-19-8) and/ or Irganox 1076&(2,6-di-tert-butyl-4-(octadecanoxycarbonylethyl)phenol).

The compositions preferably do not contain any impact modifiers either.

The colorants and other additives may for example be introduced into the composition by mixing 2% to 5% by weight based on the overall composition of polycarbonate powder containing the colorants and other additives with a polycarbonate base material, wherein the polycarbonate in powder form may have a different MVR than the base material.

Since the covers may be relatively large and may have a complex geometry for the infrastructure or transport sector, the thermoplastic composition used for the substrate layer should ideally have a sufficient flowability to be able to be processed into corresponding molded articles in injection molding processes, for example especially the injection-compression molding process. The melt volume flow rate MVR is therefore preferably 7 to 20 cm$^3$/(10 min), more preferably 9 to 19 cm$^3$/(10 min), determined according to ISO 1133-1:2011 at 300° C. and a loading of 1.2 kg.

The cover preferably also comprises a protective layer in addition to the substrate layer. This protective layer is applied on the side of the cover designed to be on the outside of the cover as installed in the vehicle, i.e. on the side oriented toward the surroundings. However the cover may additionally/alternatively also have a protective layer on the opposite side, i.e. on the side designed to be oriented toward the interior of the vehicle.

The protective layer preferably comprises, in particular preferably consists of, a scratch resistant lacquer (hardcoat, topcoat). This is preferably a polysiloxane lacquer produced by the sol-gel process. The protective layer particularly preferably also contains at least one UV absorber. The protective layer has a high abrasion and scratch resistance and thus fulfills in particular the function of a scratch resistant coating.

Commercially obtainable systems include for example AS4000, SHC5020 and AS4700 from Momentive Performance Materials. Such systems are described for example in U.S. Pat. No. 5,041,313 A, DE 3,1213,85 A1, U.S. Pat. No. 5,391,795 A and WO 2008/109072 A1. The synthesis of these materials is typically effected by condensation of alkoxy- and/or alkylalkoxysilanes under acid or base catalysis. Nanoparticles may optionally be incorporated. Preferred solvents are alcohols such as butanol, isopropanol, methanol, ethanol and mixtures thereof.

Various methods for producing a scratch resistant coating on plastics articles are known. These systems may be applied for example by immersion processes, spin coating, spraying processes or flow coating, preferably by immersion or flow processes. Curing may be effected thermally or by UV irradiation. The scratch resistant coating may be applied for example directly or after preparation of the substrate surface with a primer. A scratch resistant coating may also be applied via plasma-assisted polymerization processes, for example via an SiO$_2$ plasma. Antifogging or antireflection coatings may likewise be produced via plasma processes. It is also possible to use certain injection molding processes, for example overmolding of surface-treated films, to apply a scratch resistant coating on the resulting molded article. Various additives, for example UV absorbers, derived for example from triazoles or triazines may be present in the scratch resistant layer.

The protective layer may accordingly be a single-layer or multilayer system and thus also a combination of two or more layers a', a'' etc. In particular the protective layer may consist of the layers topcoat layer a' and primer layer a'', wherein the primer layer is arranged between the topcoat layer and the substrate layer.

In a preferred embodiment which achieves particularly good weathering stability the protective layer comprises A) a polysiloxane-based scratch resistant coating (layer a') containing
  i. at least one UV absorber from the group of benzophenones, resorcinols, 2-(2-hydroxyphenyl)benzotriazoles, hydroxyphenyl-s-triazines, 2-cyanoacrylates, oxalanilides and/or a UV inhibitor from the group of sterically hindered amines (HALS), in particular based on 2,2,6,6-tetramethylpiperidine or derivatives thereof;
  ii. at least one combination of an organomodified silane with a silica sol, wherein the organomodified silane is preferably a methyltrialkoxy- or dimethyldialkoxysilane;

and optionally in a more preferred embodiment also a primer layer (layer a'') arranged on the substrate layer and functioning as an adhesion promoter between the polysiloxane-based scratch resistant coating and the substrate layer, containing
  at least one UV absorber from the group of benzophenones, resorcinols, 2-(2-hydroxyphenyl)benzotriazoles, hydroxyphenyl-s-triazines, 2-cyanoacrylates, oxalanilides and/or sterically hindered amines (HALS), in particular based on 2,2,6,6-tetramethylpiperidine and derivatives thereof,
  wherein
  the thickness of the primer layer is 0.3 μm to 8 μm, preferably 1.1 μm to 4.0 μm.

According to the invention "derivatives" is to be understood as meaning compounds whose molecular structure comprises at the position of an H atom or a functional group a different atom or a different group of atoms or where one or more atoms/groups of atoms has/have been removed. The parent compound thus remains recognizable.

When the thermoplastic polymer upon which the composition used for the substrate layer is based is an aromatic polycarbonate, it is preferable to employ a UV absorber-containing primer to improve the adhesion of the scratch resistant coating on the substrate layer. The primer preferably contains further stabilizers, for example HALS systems (stabilizers based on sterically hindered amines), adhesion promoters and/or flow enhancers. The respective resin forming the base material of the primer layer may be selected from a multiplicity of materials and is described for example in Ullmann's Encyclopedia of Industrial Chemistry, 5$^{th}$ Edition, Vol. A18, pp. 368-426, VCH, Weinheim 1991. Polyacrylates, polyurethanes, phenol-based systems, melamine-based systems, epoxy systems and alkyd systems or mixtures of these systems may be employed. The resin is usually dissolved in suitable solvents—often in alcohols. Depending on the selected resin the curing may be effected at room temperature or at elevated temperatures. It is preferable to employ temperatures between 50° C. and 140° C.—often after a large part of the solvent has been briefly removed at room temperature. Commercially obtainable primer systems include for example SHP470, SHP470-FT2050 and SHP401 from Momentive Performance Materials. Such coatings are described for example in U.S. Pat. No. 6,350,512 B1, U.S. Pat. No. 5,869,185 A, EP 1308084 A1 and WO 2006/108520 A1.

The polysiloxane layer preferably contains organosilicon compounds having the formula $R_nSiX_{4-n}$ and/or partial condensates thereof,
  wherein the radicals R are identical or different and represent a linear or branched, saturated or mono- or poly-unsaturated or aromatic hydrocarbon radical,
  the radicals X are identical or different and represent hydrolysable groups or hydroxyl groups, preferably halogen, in particular chlorine or bromine, alkoxy groups, alkylcarbonyl groups or acyloxy groups and
  n is 0, 1, 2 or 3, preferably 1 or 2, very particularly preferably 1.

R preferably represents saturated, branched or unbranched alkyl radicals having 1 to 20 carbon atoms and/or represents mono- or polyunsaturated branched or unbranched alkenyl radicals having 2 to 20 carbon atoms or aromatic groups having 6 to 12 carbon atoms. The alkyl/alkenyl radicals more preferably have up to 12, yet more preferably up to 8, carbon atoms. It is particularly preferable when all radicals are methyl and/or phenyl.

X particularly preferably represents an alkoxy group, very particularly preferably a $C_1$- to $C_4$-alkoxy group, for example a methoxy group or an ethoxy group.

The silicon compounds $R_nSiX_{4-n}$ are hydrolysable and condensable via the radicals X. An inorganic network comprising Si—O—Si units is constructed via these hydrolytically condensable groups. In contrast to the radicals X, the radicals R are stable to hydrolysis under the typical condensation conditions.

When using the above-mentioned siloxane-based topcoat systems dry layer thicknesses of 3 µm-20 µm are preferred, more preferably 5 µm-15 µm, particularly preferably 6 µm-12 µm. "Dry layer thickness" is to be understood as meaning the layer thickness of the lacquer after application, evaporation of the solvent and subsequent thermal or UV curing. This layer thickness applies generally to preferred layer thicknesses. The layer thickness may be determined for example by white light interferometry (for example by means of a white light interferometer from Eta Optic; ETA-SST) which is preferred. Cross section preparation and microscopic detection (by optical microscopy or scanning electron microscopy) of the layers may also be used to detect the thickness via material contrast.

As described above, instead of primer/scratch resistant coating combinations it is also possible to employ one-component hybrid systems that are either thermally- or UV-curable for the multilayer articles which form the cover.

These are described for example in EP 0570165 A2, WO 2008/071363 A2 or DE 2804283 A. Commercially available hybrid systems are obtainable for example under the name PHC 587, PHC 587C as thermally-curable lacquers and under the name UVHC 3000 and UVHC 5000 as UV-curable lacquers from Momentive Performance Materials. Commercially available UV-curable lacquer systems suitable in principle according to the invention further include UVT 610 and UVT 820 from Redspot and all lacquers such as are currently also used on plastic cover panels.

In a particularly preferred process for producing the covers for the vehicles according to the invention the application of the protective layer is effected by means of the flow-coating process since it results in coated parts having a high optical quality.

The flow-coating process can be effected manually with a hose or suitable coating head, or automatically in a continuous run by means of flow-coating robots and optionally slot dies.

Further possible methods of application are immersion, blade coating, rolling, spraying or spin coating. The component parts may here be coated either hanging or stored in an appropriate goods carrier.

For larger and/or 3D component parts—i.e. component parts having a three-dimensional surface which thus also have a geometry departing from that of a sheet—the part to be coated is suspended in or placed upon a suitable goods carrier.

For small parts the coating may also be performed by hand. Here, the to-be-layered liquid primer or lacquer solution for forming the protective layer is poured over the sheet in the longitudinal direction starting from the upper edge of the small part while simultaneously the starting point of the lacquer on the sheet is passed from left to right over the sheet width. The lacquered sheets are aired and cured according to the respective manufacturer instructions while hanging vertically by a clamp.

Use of the above-described composition, in particular of the composition based on aromatic polycarbonate, provides covers for LiDAR sensors with which a very wide variety of electrical, electronic, optoelectronic and optical functional elements may be covered without impairing their function both in relation to the vehicle and its occupants and in relation to the external environment such that said function is no longer fulfilled as intended and with which at the same time attractive colorings in the visible spectral range of light are achievable, in particular a glasslike black impression.

The production of three-dimensional substrate layers, but also sheetlike layers, starting from the above-described polymer composition containing the abovementioned components is effected with commonly used incorporation methods by combining, mixing and homogenizing, wherein in particular homogenizing preferably takes place in the melt under the action of shear forces. To this end, the thermoplastic polymer, preferably aromatic polycarbonate, and any further components of the polymer molding material, preferably of the polycarbonate molding material, are mixed, extruded and granulated in the melt under customary conditions in customary melt mixing assemblies such as for example in single-screw or multi-screw extruders or in kneaders. The additives may be metered in either separately as granulates/pellets via metering balances or side feed devices or else metered at a suitable location into the solids conveying region of the extruder or into the polymer melt at elevated temperature as a melt by means of metering pumps. The masterbatches in the form of granulates or pellets may also be combined with other particulate compounds to afford a premixture and then supplied together into the solids conveying region of the extruder or into the polymer melt in the extruder via metering hoppers or side feed devices. The compounding assembly is preferably a twin-screw extruder, particularly preferably a twin-screw extruder having corotating screws, wherein the twin-screw extruder preferably has a screw length/diameter ratio of 20 to 44, particularly preferably of 28 to 40. Such a twin-screw extruder comprises a melting zone and a mixing zone or a combined melting and mixing zone and optionally a degassing zone where an absolute pressure p of preferably not more than 800 mbar, more preferably not more than 500 mbar, particularly preferably not more than 200 mbar, is established. The average residence time of the mixture composition in the extruder is preferably limited to not more than 120 seconds, particularly preferably not more than 80 seconds, particularly preferably not more than 60 seconds. In a preferred embodiment the temperature of the melt of the polymer/of the polymer alloy at the extruder outlet is 200° C. to 400° C.

In addition to extrusion the compositions employed for the substrate layer may be converted into the substrate layer by hot press molding, spinning, blow molding, deep drawing or injection molding. Injection molding or injection-compression molding is preferred here.

Injection molding processes are known to those skilled in the art and described for example in "Handbuch Spritzgießen", Friedrich Johannnaber/Walter Michaeli, Munich; Vienna: Hanser, 2001, ISBN 3-446-15632-1 or in "Anleitung zum Bau von Spritzgießwerkzeugen", Menges/Michaeli/Mohren, Munich; Vienna: Hanser, 1999, ISBN 3-446-21258-2.

Injection molding is here to be understood as comprising all injection molding processes including multicomponent injection molding and injection-compression molding processes.

Injection-compression molding processes differ from conventional injection molding processes in that the injection and/or solidification procedure involves mold plate movement. In the known injection molding process the mold plates are already opened slightly before the injection procedure to compensate for the shrinkage occurring during subsequent solidification and to reduce the required injection pressure. A pre-enlarged cavity is therefore already present at the beginning of the injection procedure. Flash faces of the mold ensure that the pre-enlarged cavity is still sufficiently leakproof even when the mold plates have been somewhat opened. The plastics composition is injected into this pre-enlarged cavity and is simultaneously/subsequently compressed as the mold moves towards the closed position. Particularly in the production of large surface area and thin-walled moldings having long flow paths, the more complex injection-compression molding technique is preferred or in some cases essential. A reduction of the injection pressures required for large moldings is achieved only in this way. Furthermore, stresses/warpage in the injection molded part arising from high injection pressures can be avoided by injection-compression molding.

The cover is preferably integrated into the vehicle body via non-IR-transparent regions. "Non-IR transparent" is to be understood here as meaning a transmission in the non-IR-transparent region in its respective thickness of less than 50% in the range from 800 nm to 2500 nm determined according to DIN ISO 13468-2:2006. These are nontransparent layers, preferably made of a polymer blend, more preferably made of a polycarbonate blend, preferably comprising polycarbonate as the predominantly present component, very particularly preferably comprising an ABS (acrylonitrile-butadiene-styrene) or polyester as blend partner. Such a nontransparent layer is over large regions in direct contact with the above-described layer construction made of the substrate layer and the optionally present protective layer.

Upon shaping of the non-IR-transparent material to match the cover employed according to the invention, the junction between the materials is preferably in edge regions so that any irregularities are concealed. In every case there are regions in which the substrate layer is disposed upon the non-IR-transparent layer or the non-IR-transparent layer is disposed upon the substrate layer. "Disposed upon" is here to be understood as meaning an overlapping of the layers when the cover is viewed perpendicularly to the joint face of the individual layers. It will be appreciated that the non-IR-transparent layer need not be but may be in direct contact with the substrate layer since it may be arranged behind further layers.

These non-IR-transparent materials function in particular as reinforcing frame elements. Reinforcing frame elements are preferably produced using thermoplastics containing fillers and/or reinforcers.

The fillers and/or reinforcers used are typically in the form of fibres, platelets, tubes, rods or are spherical or particulate. Suitable fillers and reinforcers include for example talc, wollastonite, mica, kaolin, diatomaceous earth, calcium sulfate, calcium carbonate, barium sulfate, glass fibres, glass or ceramics spheres, hollow glass spheres or hollow ceramics spheres, glass or mineral wool, carbon fibres or carbon nanotubes. Preferred fillers are fillers which bring about an isotropic shrinkage behaviour of the composition.

In the context of the present invention the use of talc and short glass fibres is particularly preferred.

Glass or ceramics spheres or hollow spheres can increase the scratch resistance of this surface.

In parts of the substrate layer not arranged in front of the LiDAR sensor, i.e. not covering said sensor with respect to the surroundings, the substrate layer may also comprise materials containing fillers and reinforcers. The proportion thereof is preferably 5% by weight to 40% by weight, preferably 7% by weight to 30% by weight, more preferably 8% by weight to 25% by weight, wherein the weight fractions relate to the overall composition of the substrate layer. The substrate layer is free from fillers and reinforcers in the region made of the described thermoplastic composition.

The covers comprising/made of the opaque substrate layers optionally having a protective layer may be applied on any desired carrier systems made of metal or plastic in vehicle construction. This may be achieved by means of special adhesive systems, for example polyurethane-based adhesive systems. The combination of the LiDAR sensor and the cover may be installed in a vehicle as one unit; but the LiDAR sensor and the cover may likewise be installed separately. It is preferable when the LiDAR sensor is initially installed and then the cover, in particular a front panel, is subsequently placed in front of the LiDAR sensor.

In the context of the present invention preferred embodiments recited for individual features may also be combined with one another provided they are not contradictory.

FIGURES

EXAMPLES

Figure 1:
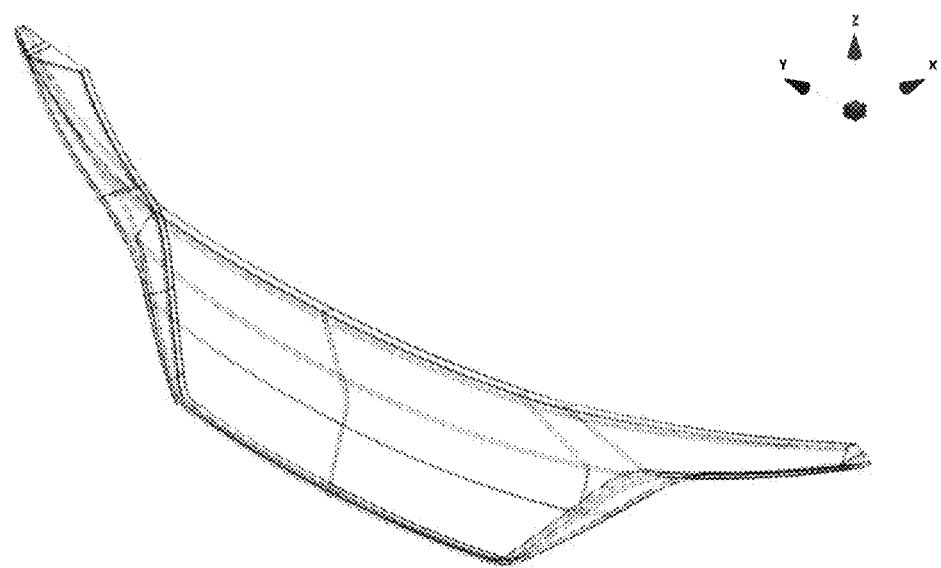
FIG. 1 shows a front panel as an example for a cover according to the invention.

There follows a detailed description of the invention with reference to working examples, the methods of determination described here being used for all corresponding parameters in the present invention description unless otherwise stated.

A number of the substrate materials described hereinbelow contained customary additives such as mold release agents, heat stabilizers and/or UV absorbers. Preliminary tests were used to check and determine that these additives do not influence the signal of the LiDAR sensor.

Substrate 1: Comparative Example

Composition containing 99.99984% by weight of polycarbonate from Covestro Deutschland AG having an MVR of about 12 cm$^3$/10 min measured at 300° C. at a loading of 1.2 kg (according to ISO 1133-1:2012-03) and based on bisphenol A and terminated with phenol. The composition also contained 0.00006% by weight of Macrolex Violet 3R (colorant of formula (10)) and 0.0001% by weight of Macrolex Blue RR (colorant of formula (6)).

Substrate 2: Comparative Example

Composition containing 99.8% by weight of polycarbonate from Covestro Deutschland AG having an MVR of about 12 cm³/10 min measured at 300° C. at a loading of 1.2 kg (according to ISO 1133-1:2012-03) and based on bisphenol A and terminated with phenol. The composition also contained 0.1% by weight of Solvent Blue 36 and 0.1% by weight of Macrolex Green G (colorant of formula (2)).

Substrate 3: Comparative Example

Composition containing 99.8000% by weight of polycarbonate from Covestro Deutschland AG having an MVR of about 12 cm³/10 min measured at 300° C. at a loading of 1.2 kg (according to ISO 1133-1:2012-03) and based on bisphenol A and terminated with phenol. The polycarbonate contains 0.134% by weight of Solvent Blue 36 (further colorant), 0.044% by weight of Macrolex Orange 3G (colorant of formula (15)) and 0.022% by weight of Amaplast Yellow GHS (Solvent Yellow 163, colorant of formula (16)).

Substrate 4: Comparative Example

Composition containing 99.84% by weight of polycarbonate from Covestro Deutschland AG having an MVR of about 12 cm³/10 min measured at 300° C. at a loading of 1.2 kg (according to ISO 1133-1:2012-03) and based on bisphenol A and terminated with phenol. The material contained 0.16% by weight of carbon black.

Substrate 5: Comparative Example

Composition containing 93.195850% by weight of polycarbonate from Covestro Deutschland AG having an MVR of about 18 cm³/10 min measured at 300° C. at a loading of 1.2 kg (according to ISO 1133-1:2012-03) and based on bisphenol A and terminated with tert-butylphenol. The composition additionally contained 6.756% by weight of Kronos 2230 (titanium dioxide), 0.00006% by weight of Macrolex Yellow 3G (colorant of formula (14)), 0.00009% by weight of Macrolex Violet 3R (colorant of formula (10)) and 0.054% by weight of Tinopal (2,5-thiophenyldibis(5-tert-butyl-1,3-benzoxazene); optical brightener).

Substrate 6: Comparative Example

Composition containing 99.435% by weight of polycarbonate from Covestro Deutschland AG having an MVR of about 12 cm³/10 min measured at 300° C. at a loading of 1.2 kg (according to ISO 1133-1:2012-03) and based on bisphenol A and terminated with phenol. The polycarbonate contained 0.1% by weight of Kronos 2230 (titanium dioxide), 0.03% by weight of Sicotan Yellow K2107 (Pigment Brown 24, CAS 68186-90-3; further colorant), 0.022% by weight of Heucodur Blue 2R from Heubach (Pigment Blue 28, cobalt-aluminate blue spinel, CAS 1345-16-0; further colorant), 0.35% by weight of Macrolex Red EG (structure 8) and 0.063% by weight of Bayferrox 110 M from Lanxess AG ($Fe_2O_3$; CAS 001309-37-1).

Substrate 7: Comparative Example

Polycarbonate/ABS blend from Covestro Deutschland AG having an MVR of about 17 cm³/10 min measured at 260° C. at a loading of 5.0 kg (according to ISO 1133-1:2012-03) and having an ABS proportion of about 30% by weight and an SAN content of about 10% by weight. The material contained no colorants.

Substrate 8: Comparative Example

Composition containing 99.96% by weight of polycarbonate from Covestro Deutschland AG having an MVR of about 12 cm/10 min measured at 300° C. at a loading of 1.2 kg (according to ISO 1133-1:2012-03) and based on bisphenol A and terminated with phenol. The composition contained 0.04% by weight of carbon black.

Substrate 9: Comparative Example

Composition containing 99.78% by weight of polycarbonate from Covestro Deutschland AG having an MVR of about 12 cm³/10 min measured at 300° C. at a loading of 1.2 kg (according to ISO 1133-1:2012-03) and based on bisphenol A and terminated with phenol. The composition contained 0.02% by weight of carbon black and 0.2% by weight of Macrolex Violet B (colorant of formula (11)).

Substrate 10: Inventive

Composition containing 99.874% by weight of polycarbonate from Covestro Deutschland AG having an MVR of about 18 cm³/10 min measured at 300° C. at a loading of 1.2 kg (according to ISO 1133-1:2012-03) and based on bisphenol A and terminated with tert-butylphenol. The composition also contained 0.048% by weight of Macrolex Orange 3G (colorant of formula (15)), 0.01% by weight of Macrolex Violet B (colorant of formula (11)) and 0.068% by weight of colorant of formula 4a/4b (1:1).

Substrate 11: Inventive

Composition containing 99.8% by weight of polycarbonate from Covestro Deutschland AG having an MVR of about 12 cm³/10 min measured at 300° C. at a loading of 1.2 kg (according to ISO 1133-1:2012-03) and based on bisphenol A and terminated with phenol and containing 0.1% by weight of Macrolex Violet 3R (colorant of formula (10)) and 0.1% by weight of Macrolex Green 5B (colorant of formula (1)).

Substrate 12: Inventive

Composition containing 99.894% by weight of polycarbonate from Covestro Deutschland AG having an MVR of about 12 cm³/10 min measured at 300° C. at a loading of 1.2 kg (according to ISO 1133-1:2012-03) and based on bisphenol A and terminated with phenol and containing 0.0360% by weight of Macrolex Blue RR (colorant of formula (6)) and 0.07% by weight of Macrolex Violet 3R (colorant of formula (10)).

Substrate 13: Comparative

Injection molded colorant- and carbon black-free sheet made of polyamide 6,6 having a thickness of 3.0 mm.

Substrate 14: Comparative

Acrylonitrile-butadiene-styrene copolymer (ABS) film having a thickness of 0.6 mm.

Substrate 15: Comparative

Polyether sulfone in the form of a 0.175 mm-thick Ajedium film from Solvay Solexis Inc.

Substrate 16: Comparative

Polyester made of cyclohexanedimethanol, terephthalic acid and tetramethylcyclobutanediol having the trade name Tritan from Eastman Chemical.

Substrate 17: Comparative

Siloxane-containing block co-condensate based on bisphenol A-containing polycarbonate having a siloxane content of 5% and produced as described in EP 3099731 A1.

Substrate 18: Comparative

Polypropylene sheet having a thickness of 4 mm.

Substrate 19: Comparative

Sheet made of Altuglass-brand polymethyl methacrylate (Arkema).

Compounding

The compounding of the components with the substrates was effected in a KraussMaffei Berstorff ZE25 twin-screw extruder at a barrel temperature of 260° C., a melt temperature of about 280° C. and a speed of 100 rpm with the amounts of components specified in the examples. The compositions were processed into 5 mm-thick injection molded polycarbonate sheets.

Production of the Test Specimens

Round sheets having dimensions of 80 mm×2 mm (diameter by height) were manufactured in optical quality. The melt temperature was 280° C. and the mold temperature was 80° C. The respective granulate was dried at 120° C. in a vacuum drying cabinet for 5 hours prior to processing.

Employed LIDAR Sensor

A Velodyne Puck VLP 16 LiDAR sensor was employed. Said sensor operates in the wavelength range from 895 to 915 nm (tolerance range). The nominal wavelength, i.e. actual operating wavelength, is 903 nm.

The essential characteristics of this sensor include:

Vertical detection angle −15° to +150 with 2° spacing between scanning planes; horizontal detection angle 360°. The software includes a multibeam function with 16 beams for minimizing shadow effects. Horizontal resolution of the laser system is 0.1° to 0.4° depending on rotational velocity. The rotational velocity of vertical detection is adjustable between 5 to 20 Hz. At a data rate of 2 Mbyte/sec 300000 points/second are detected. The measurement accuracy achieved is about +/−3 cm, corresponding to 1 Sigma. The detectable measuring distance is between 1 mm and 100 metres. The energy requirement of the sensor system is 8 W of electrical power, corresponding to 0.7 A at 12 V. The overall dimensions of the sensor are: diameter 100 mm and height 65 mm.

Method of Measurement

Figure 2:
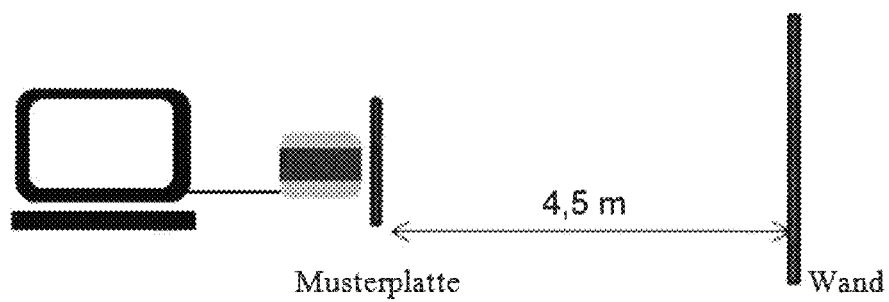
FIG. 2 shows the experimental set up used in the examples section.

The LiDAR sensor (Velodyne LiDAR VLP-16, 16 lasers having an operating wavelength of 903 nm) was positioned in a room and oriented such that a target object at a distance of exactly 4.5 m was detected. The accompanying software (Veloview from Velodyne) was set to "intensity mode". In this setting the input signal reflected into the sensor is represented in a multicolour representation according to its intensity. The sensitivity of the representation was set to 0-100. Subsequently at a distance of about 100 mm plastic sheets having the thicknesses reported in table 1 were placed in front of the active sensor region so that both the output signal and the reflected input signal had to penetrate the wall thickness of the test sheet (FIG. 2). Using the representation of the target object in the evaluation software it is possible to perform an unambiguous assignment of the respective measured signal attenuation for the individual test specimens (plastic sheets) to the colour formulation used.

The measured intensities of the recorded laser signal were between 0% and 100%. The lower the attenuation (weakening) of the signal, the more suitable is the formulation for LiDAR-assisted sensor applications in the automotive sector. The permeability of the respective sheet to IR radiation in the range from 800 nm to 2500 nm was determined according to DIN ISO 13468-2:2006. The light transmission in the VIS region of the spectrum (380 to 780 nm, degree of transmission Ty) was determined according to DIN ISO 13468-2:2006 (D65, 10°, layer thickness of specimen sheet: 4 mm). The transmission measurements were performed using a Perkin Elmer Lambda 950 spectrophotometer with a photometer sphere.

It was also investigated whether the signal of the LiDAR sensor changes according to the distance between the sensor and the cover. There was no relevant change in the signal of the LiDAR sensor in an investigated distance range from 5 to 50 cm.

Results

TABLE 1

Measured results for light transmission and LiDAR sensor suitability

| Examples | Substrate | Colorants and other components | Total concentration of colorant | Ty | Thickness | Intensity of LiDAR signal after traversing substrate |
|---|---|---|---|---|---|---|
| 1 comparative example | substrate 1 | (6); (10) | 0.00016% by weight | 88.1% | 5 mm | 70-90% |
| 2 comparative example | substrate 2 | (2); further colorant | 0.2% by weight | 0% | 2 mm | 20-25% |
| 3 comparative example | substrate 3 | (15); (16); further colorant | 0.199% by weight | 0% | 2 mm | 35-40% |
| 4 comparative example | substrate 4 | Carbon black | 0.16% by weight | 0% | 5 mm | 0% |
| 5 comparative example | substrate 5 | (14); (10); $TiO_2$ | 0.00015% by weight | 0% | 3.2 mm | 0% |
| 6 comparative example | substrate 6 | $TiO_2$; (8); further colorants; $Fe_2O_3$ | 0.465% by weight | 0% | 3.2 mm | 0% |
| 7 comparative example | substrate 7 | — | 0% by weight | 23.8% | 3.2 mm | 0% |

TABLE 1-continued

Measured results for light transmission and LiDAR sensor suitability

| Examples | Substrate | Colorants and other components | Total concentration of colorant | Ty | Thickness | Intensity of LiDAR signal after traversing substrate |
|---|---|---|---|---|---|---|
| 8 comparative example | substrate 8 | Carbon black | 0.04% by weight | 0% | 2.0 mm | 0% |
| 9 comparative example | substrate 9 | Carbon black; (11) | 0.2% by weight | 0% | 2.0 mm | 0% |
| 10 inventive | substrate 10 | (4a/4b); (11); (15) | 0.126% by weight | 0% | 2.0 mm | 70-90% |
| 11 inventive | substrate 11 | (10); (1) | 0.2% by weight | 0% | 4.0 mm | 50-70% |
| 12 inventive | substrate 12 | (6); (10) | 0.106% by weight | 0.7% | 2.0 mm | 70-90% |
| 13 inventive | Substrate 12, two 2.0 mm sheets one behind the other | (6); (10) | 0.106% by weight | <0.5% | 4.0 mm | 70-90% |
| 14 inventive | substrate 10 | (4a/4b); (11); (15) | 0.126% by weight | 0% | 3.0 mm | 70-90% |
| 15 comparative example | substrate 13 | — | — | 46% | 3.0 mm | 0% |
| 16 comparative example | substrate 14 | — | — | 40% | 0.6 mm | 0% |
| 17 comparative example | substrate 15 | — | — | 87% | 0.175 mm | 5% |
| 18 comparative example | substrate 16 | — | — | 90% | 2.3 mm | 10-20% |
| 19 comparative example | substrate 17 | — | — | 23% | 2.3 mm | 0% |
| 20 comparative example | substrate 18 | — | — | 61% | 4.0 mm | 0% |
| 21 comparative example | substrate 19 | — | — | 92.5% | 2.7 mm | 70-90% |

As is apparent from table 1 only certain substrate materials are suitable. Even very thin layer thicknesses of unsuitable materials, for example of polypropylene, attenuate the sensor signal to such an extent that an intensity was no longer measurable in the measuring setup. It was likewise surprising that different substrates such as polyamide (Ex. 15) and ABS (Ex. 16) showed no permeability to the LiDAR sensor in the measuring setup. All of these thermoplastics are transparent or at least semitransparent in the IR range in relevant layer thicknesses. Surprisingly, completely amorphous polymers such as polyethersulfone and polyester also exhibit a high attenuation for the LiDAR sensor.

Even modified polycarbonates such as siloxane-containing polycarbonates cannot be suitably combined with a LiDAR sensor. While BPA-containing polycarbonate has a good permeability to the LiDAR sensor, traces of pigments are sufficient to drastically attenuate permeability. It is thus known that carbon black has a high absorption over the entire spectral range, i.e. in the IR range too; nevertheless polycarbonate containing traces of carbon black still exhibits a residual transmission. Nevertheless, such compositions are unsuitable for combination with a LiDAR sensor (Example 9).

It was furthermore entirely surprising that combinations of colorants soluble in a polycarbonate matrix in some cases also resulted in high attenuations of the LiDAR signal (examples 2 and 3). By contrast the inventive combination of colorants in a thermoplastic matrix such as bisphenol A-based polycarbonate and/or polymethyl methacrylate is suitable for use in conjunction with a LiDAR sensor.

In addition, the melt volume flow rate of a number of compositions was determined over a particular time interval according to ISO 1133-1:2011 at 300° C./320° C. at a loading of 1.2 kg (table 2). Is it apparent therefrom that the substrate materials 2 and 3 of the comparative examples are markedly more unstable than the inventive substrate material 11.

TABLE 2

MVR at 300° C. and 320° C., 1.2 kg loading for substrate materials 2, 3 and 11

|  | Substrate material 2 | Substrate material 3 | Substrate material 11 |
|---|---|---|---|
| 300° C. | | | |
| after 5 min | 12.0 | 12.3 | 12.5 |
| after 20 min | 12.5 | 13.7 | 13.2 |
| after 30 min | 13.0 | 15.0 | 13.3 |
| 320° C. | | | |
| after 5 min | 21.5 | 22.3 | 21.9 |
| after 20 min | 24.8 | 30.1 | 23.0 |
| after 30 min | 26.5 | 34.7 | 23.5 |

The invention claimed is:
1. A vehicle comprising
   a) a LiDAR sensor which emits laser pulses having a wavelength in the range from 800 to 2500 nm and
   b) a cover partially or completely surrounding the LiDAR sensor having a substrate layer comprising a region made of a thermoplastic composition based on aromatic polycarbonate, polyester carbonate and/or polymethyl methacrylate,
wherein the composition has a light transmission in the range from 380 to 780 nm of less than 25.0% determined at a layer thickness of 4 mm according to DIN ISO 13468-2: 2006 (D65, 10°) and
the region of the substrate layer made of the thermoplastic composition in its respective thickness has a permeability to IR radiation in the range from 800 nm to 2500 nm of at least 40% determined according to DIN ISO 13468-2:2006.

2. The vehicle according to claim 1, wherein the thermoplastic composition of the substrate layer contains less than 0.0005% by weight of carbon black.

3. The vehicle according to claim 1, wherein the composition contains no carbon black.

4. The vehicle according to claim 1, wherein the composition contains no further thermoplastic polymers.

5. The vehicle according to claim 1, wherein the composition contains 0% to less than 5.0% by weight of further thermoplastic polymers.

6. The vehicle according to claim 1, wherein the thickness of the region of the substrate layer made of the thermoplastic composition is 2 mm to 4 mm.

7. The vehicle according to claim 1, wherein in addition to the substrate layer and a scratch resistant coating optionally present on one or more sides the cover comprises no further layers.

8. The vehicle according to claim 1, wherein the cover is a front panel, a rear panel, a bumper, a radiator grill, a vehicle roof, a vehicle roof module or a vehicle side element.

9. The vehicle according to claim 1, wherein the thermoplastic composition of the substrate layer contains
i) at least 70% by weight of thermoplastic polymer from the group consisting of aromatic polycarbonate, polyester carbonate and/or polymethyl methacrylate,
ii) at least one green and/or one blue colorant selected from the group consisting of the colorants of formulae (1), (2a-c), (3), (4a), (4b), (5) and/or (6)

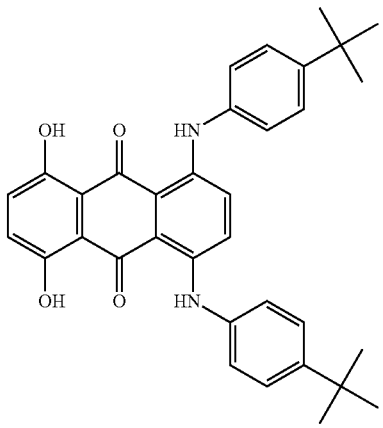
(2a)

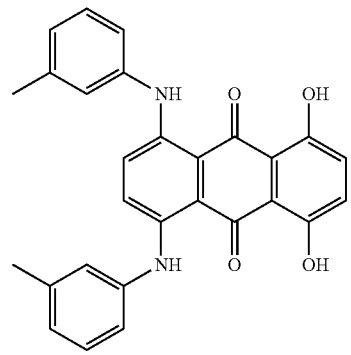
(2b)

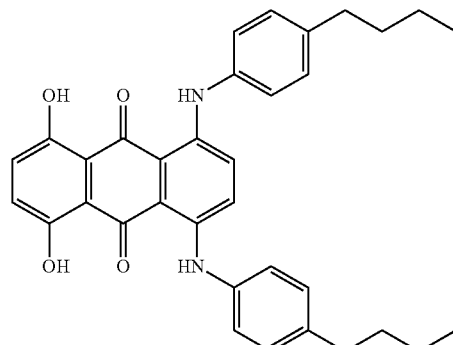
(2c)

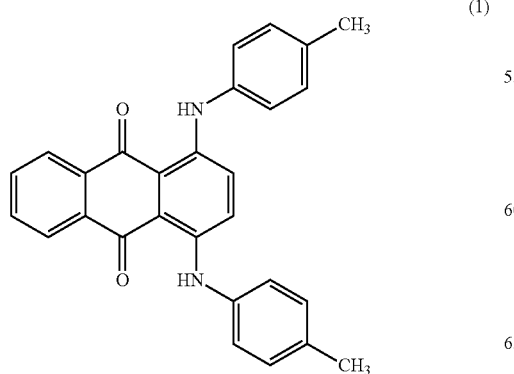
(1)

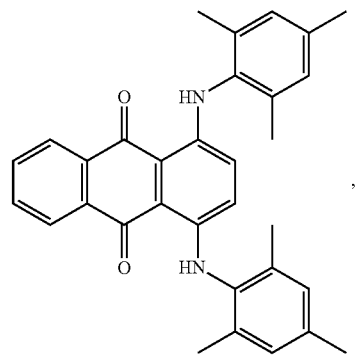
(3)

-continued
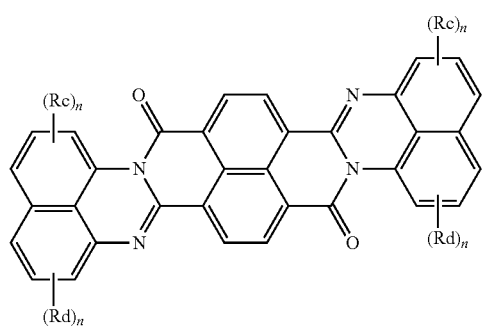
(4a)
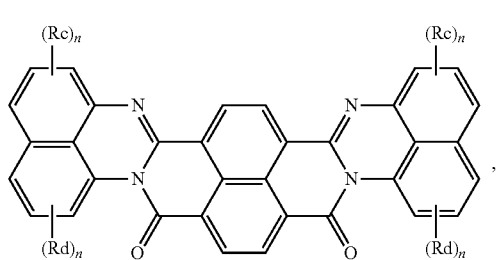
(4b)
wherein
Rc and Rd independently of one another represent a linear or branched alkyl radical or halogen,
n independently of the respective R represents an integer between 0 and 3, wherein the radical for n=0 is hydrogen,
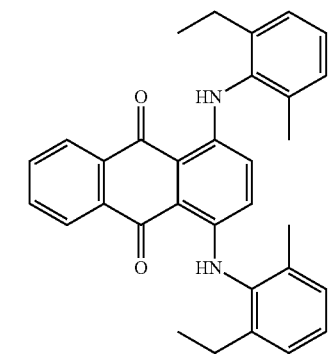
(5)
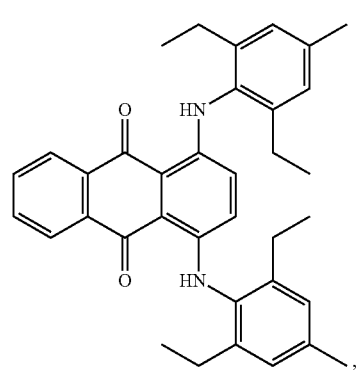
(6)
iii) at least one red and/or violet colorant selected from the group consisting of the colorants of formulae (7), (8), (9), (10), (11), (12a), (12b) and/or (13)
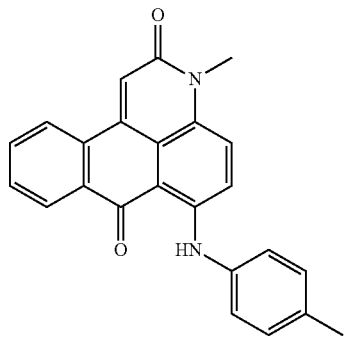
(7)
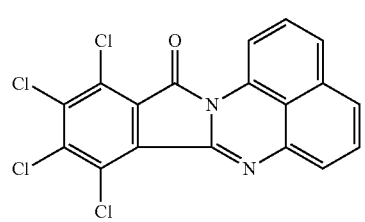
(8)
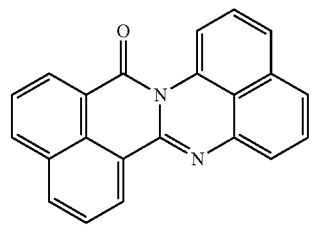
(9)
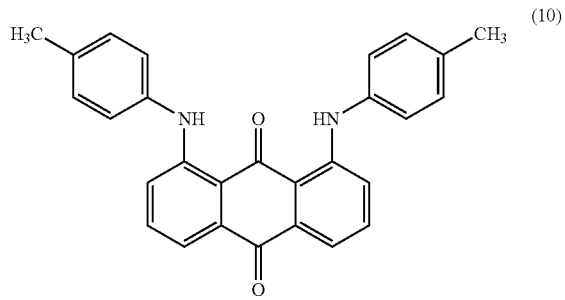
(10)
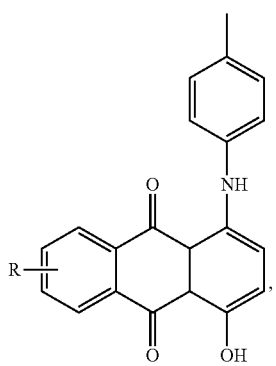
(11)

wherein R is selected from the group consisting of H and p-methylphenylamine radical,

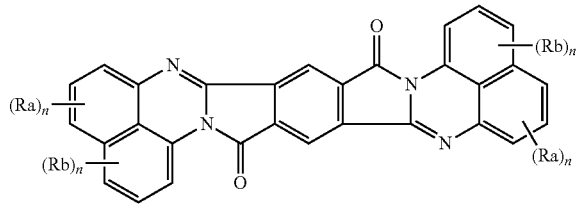
(12a)

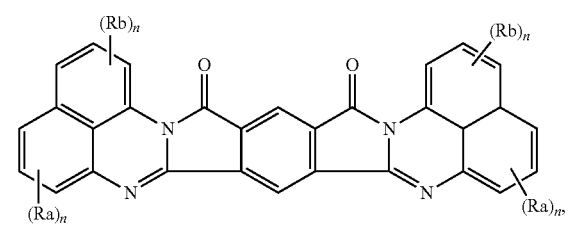
(12b)

wherein

Ra and Rb independently of one another represent a linear or branched alkyl radical or halogen, n independently of the respective R represents an integer between 0 and 3, Wherein the radical for n=0 is hydrogen,

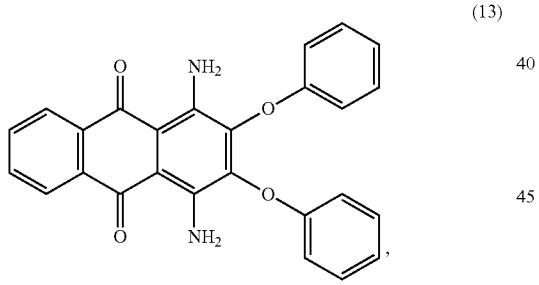
(13)

iv) optionally one or more further colorants selected from the group consisting of the yellow and orange colorants of formulae (14), (15), (16), (17) and/or (18)

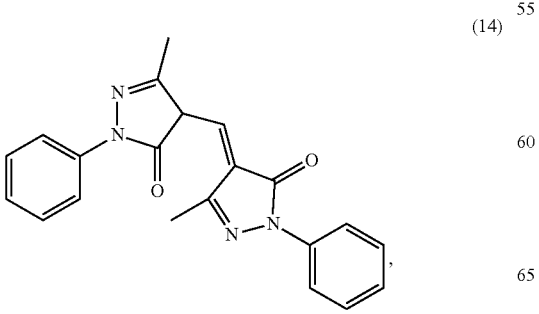
(14)

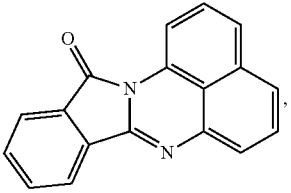
(15)

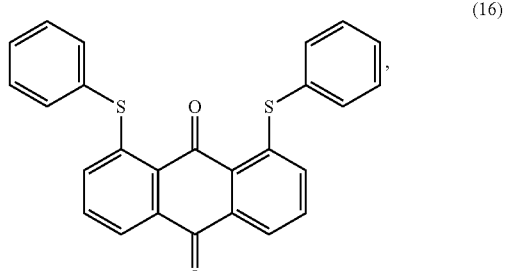
(16)

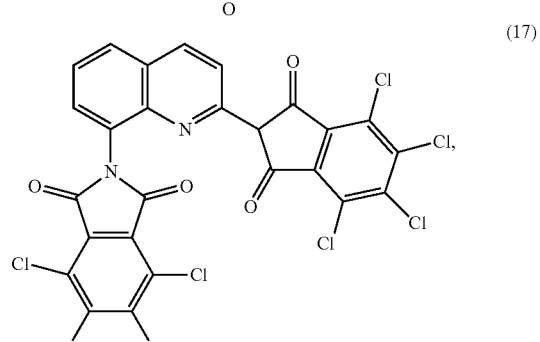
(17)

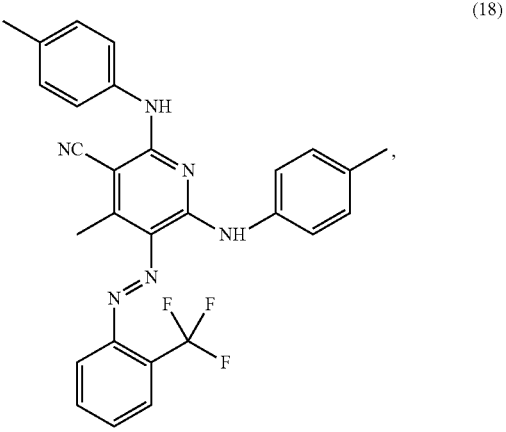
(18)

wherein the sum of the colorants ii) to iv) is >0.05% by weight and wherein the composition contains 0% to less than 30.0% by weight of further thermoplastic polymers and 0% to less than 0.02% by weight of carbon black, wherein the composition contains in addition to the colorants of groups ii) to iv) less than 0.1% by weight of further colorants and less than 0.1% by weight of titanium dioxide and wherein the thickness of the region of the substrate layer made of the thermoplastic composition is 1.0 to 7.0 mm.

10. The vehicle according to claim 9, wherein the sum of the colorants ii) to iv) in the thermoplastic composition of the substrate layer is at least 0.10% by weight.

11. The vehicle according to claim 9, wherein the composition contains less than 0.1% by weight of white pigment.

12. The vehicle according to claim 9, wherein, in addition to the components i), ii), iii) and optionally iv), carbon black, further thermoplastic polymer and/or colorants distinct from the colorants of groups ii) to iv), the composition of the substrate layer contains no further components with the exception of
- v) optionally heat stabilizers, mold release agents, UV absorbers, flame retardants, antistats and/or flow enhancers.

13. A vehicle comprising
- a) a LiDAR sensor which emits laser pulses having a wavelength in the range from 800 to 2500 nm and
- b) a cover partially or completely surrounding the LiDAR sensor having a substrate layer, wherein the substrate layer comprises a region made of a thermoplastic composition having a light transmission in the range from 380 to 780 nm of less than 0.1% determined at a layer thickness of 4 mm according to DIN ISO 13468-2:2006 (D65, 10°), and the region of the substrate layer in its respective thickness has a permeability to IR radiation in the range from 800 nm to 2500 nm of at least 50% determined according to DIN ISO 13468-2:2006 and wherein the composition consists of
  - i) at least 85% by weight of thermoplastic polymer selected from the group consisting of aromatic polycarbonate, polyester carbonate and/or polymethyl methacrylate,
  - ii) at least one green and/or one blue colorant selected from the group consisting of the colorants of formulae (1), (2a-c), (3), (4a), (4b), (5) and/or (6)

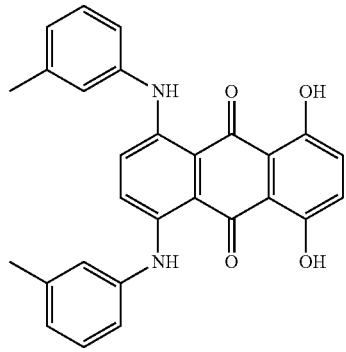
(1)

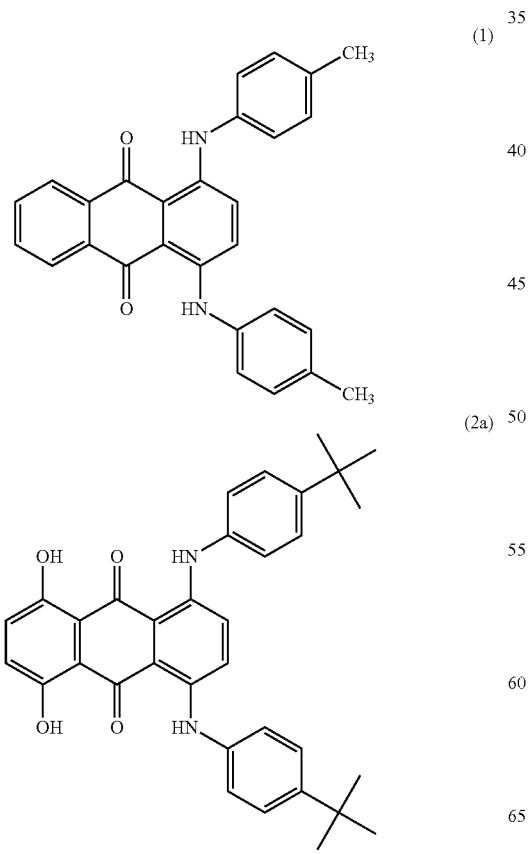
(2a)

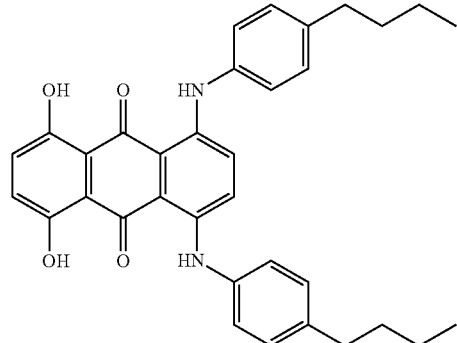
(2b)

(2c)

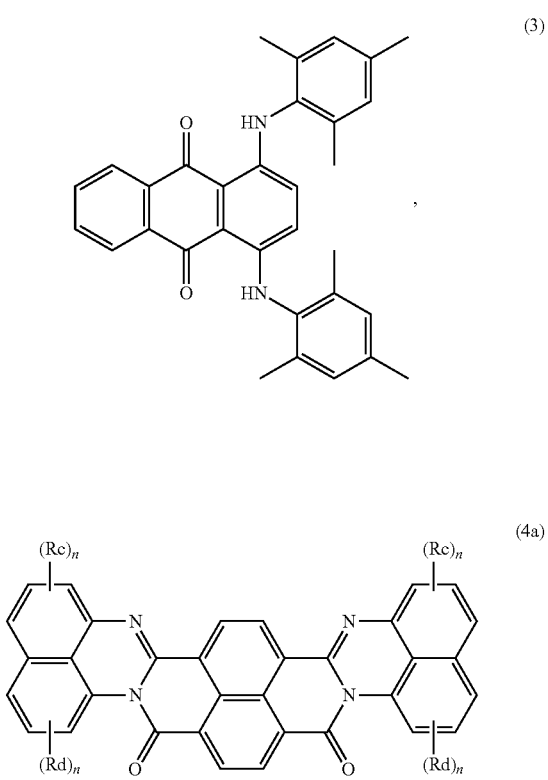
(3)

(4a)

-continued
(4b)
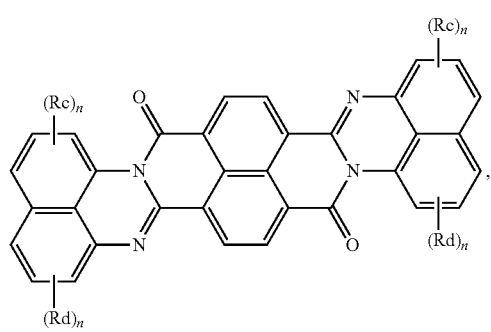
wherein
Rc and Rd independently of one another represent a linear or branched alkyl radical or halogen,
n independently of the respective R represents an integer between 0 and 3, wherein the radical for n=0 is hydrogen,
(5)
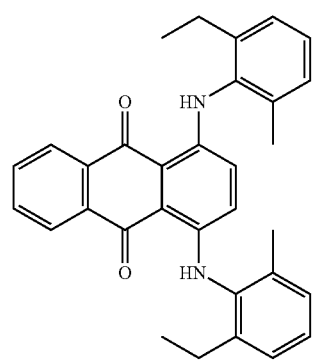
(6)
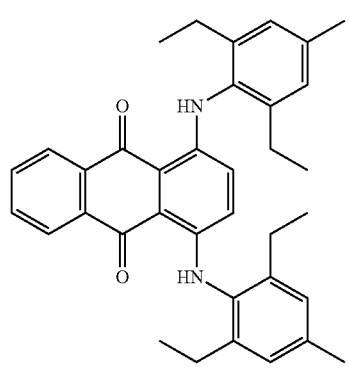
and
iii) at least one red and/or violet colorant selected from the group consisting of the colorants of formulae (7), (8), (9), (10), (11), (12a), (12b) and/or (13)
(7)
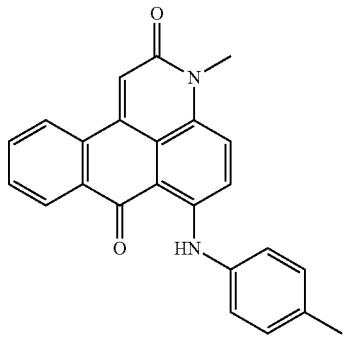
(8)
(9)
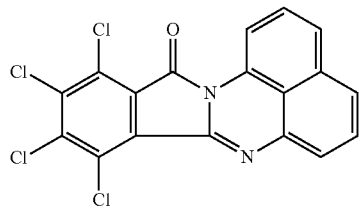
(10)
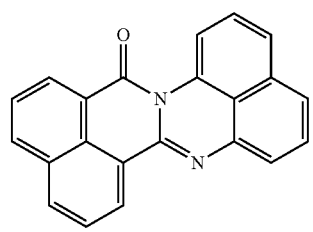
(11)
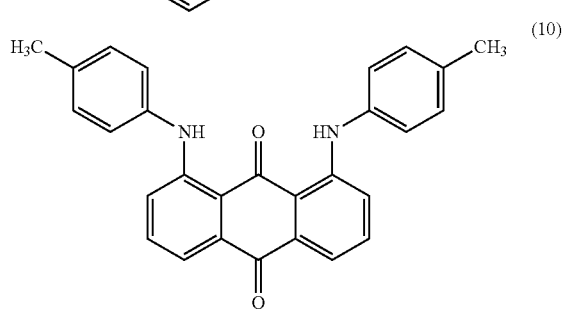

wherein R is selected from the group consisting of H and p-methylphenylamine radical,

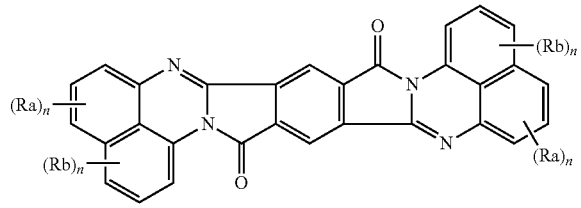
(12a)

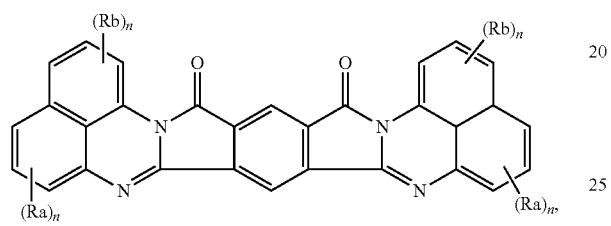
(12b)

wherein

Ra and Rb independently of one another represent a linear or branched alkyl radical or halogen, n independently of the respective R represents an integer between 0 and 3, wherein the radical for n=0 is hydrogen,

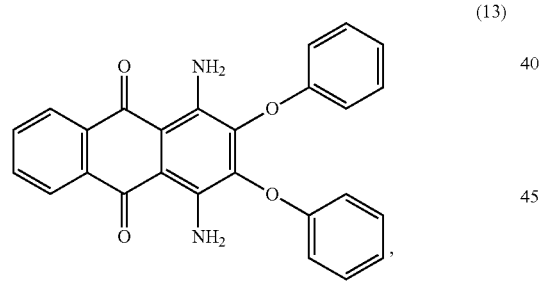
(13)

iv) optionally further colorants selected from the group consisting of the colorants of formulae (14), (15), (16), (17) and/or (18)

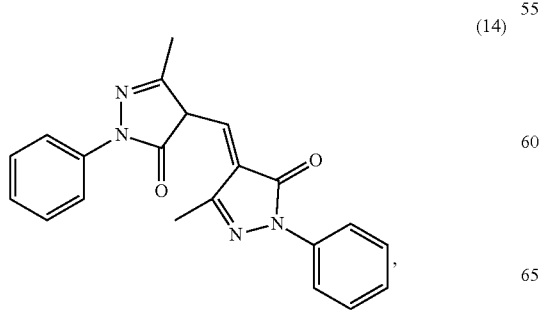
(14)

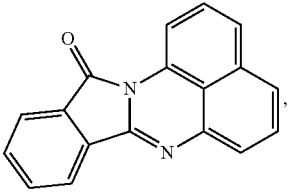
(15)

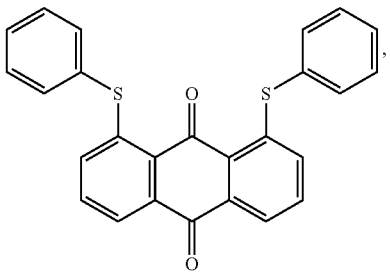
(16)

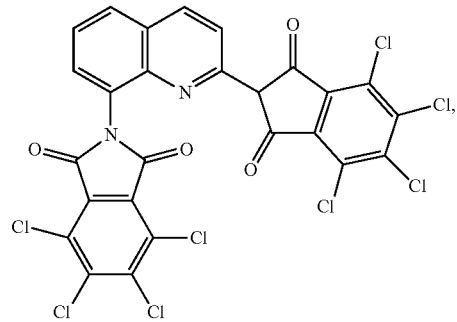
(17)

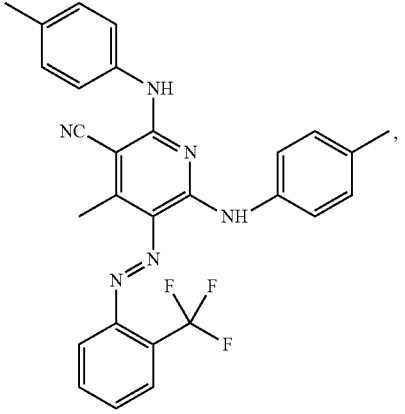
(18)

v) optionally heat stabilizers, mold release agents, UV absorbers, antistats and/or flow enhancers, vi) 0% to less than 30.0% by weight of further thermoplastic polymers, vii) 0% to less than 0.02% by weight of carbon black, less than 0.1% by weight of further colorants and less than 0.1% by weight of titanium dioxide, wherein the sum of the colorants ii) to iv) is >0.10% by weight;

and wherein the thickness of the region of the substrate layer made of the thermoplastic composition is 1.0 to 6.0 mm.

14. A method of utilizing a molding having a substrate layer comprising a region made of a thermoplastic composition based on aromatic polycarbonate, polyester carbonate and/or polymethyl methacrylate having a thickness of this region of the substrate layer of 1.0 to 7.0 mm, wherein the composition has a light transmission in the range from 380 to 780 nm of less than 25% determined at a layer thickness of 4 mm according to DIN ISO 13468-2:2006 (D65, 10°) and the region of the substrate layer made of the thermoplastic composition in its respective thickness has a permeability to IR radiation in the range from 800 nm to 2500 nm of at least 50% determined according to DIN IS 13468-2:2006, for partially or completely covering a LiDAR sensor which emits laser pulses having a wavelength in the range from 800 to 2500 nm.

15. The method according to claim 14, wherein the composition contains
   i) at least 70% by weight of a thermoplastic from the group consisting of aromatic polycarbonate, polyester carbonate and/or polymethyl methacrylate,
   ii) at least one green and/or one blue colorant selected from the group consisting of the colorants of formulae (1), (2a-c), (3), (4a), (4b), (5) and/or (6)

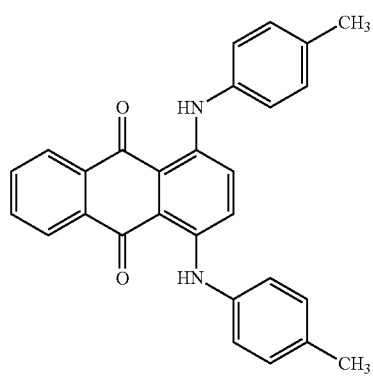
(1)

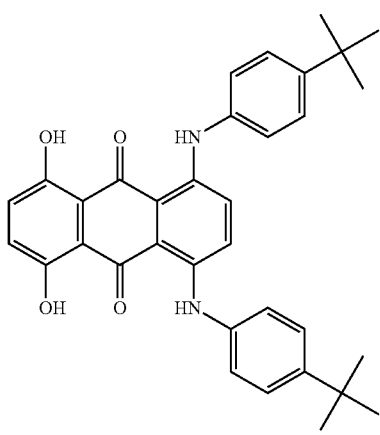
(2a)

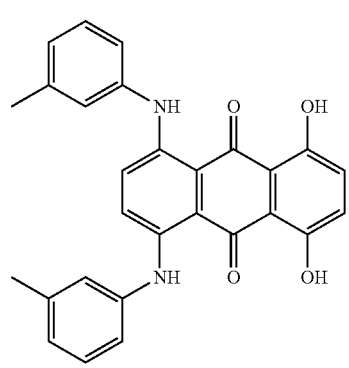
(2b)

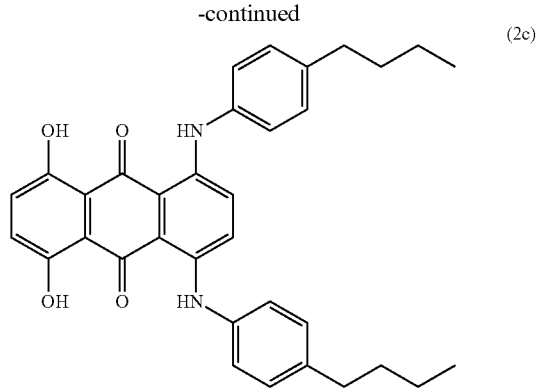
(2c)

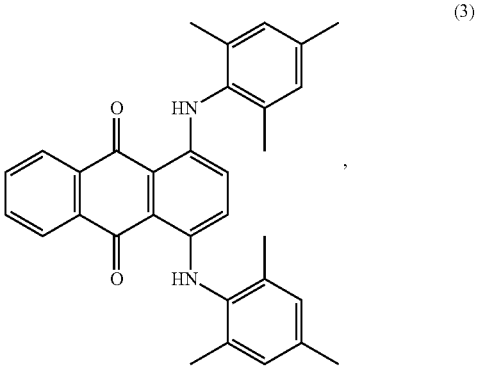
(3)

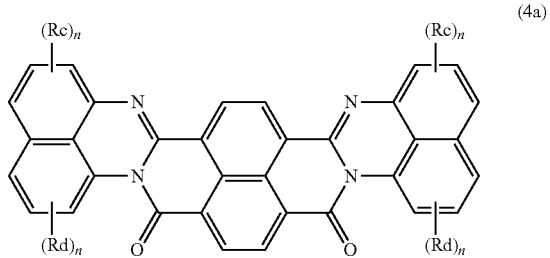
(4a)

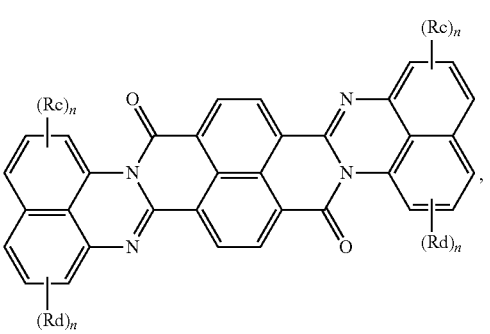
(4b)

wherein
Rc and Rd independently of one another represent a linear or branched alkyl radical or halogen,
n independently of the respective R represents an integer between 0 and 3, wherein the radical for n=0 is hydrogen,

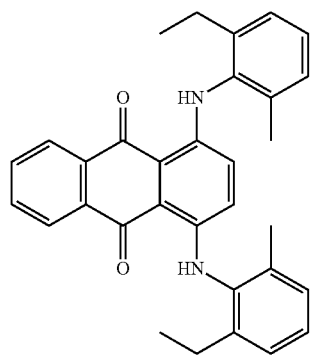

(5)

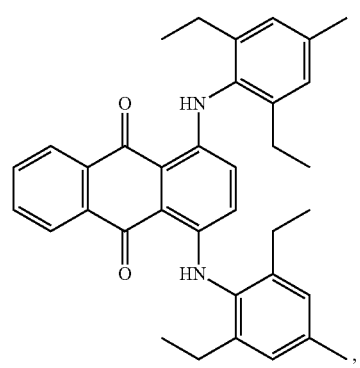

(6)

and iii) at least one red and/or violet colorant selected from the group consisting of the colorants of formula (7), (8), (9), (10), (11), (12a), (12b) and/or (13)

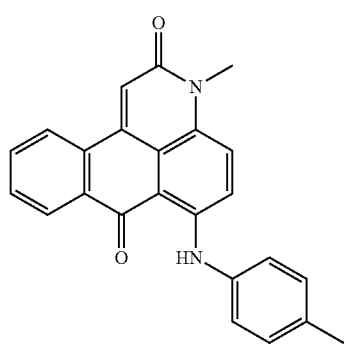

(7)

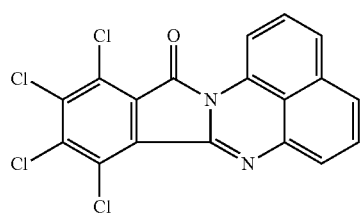

(8)

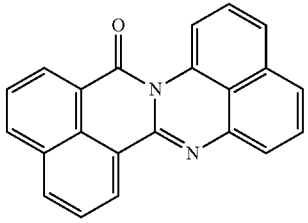

(9)

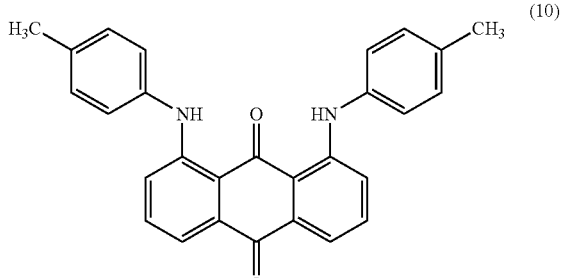

(10)

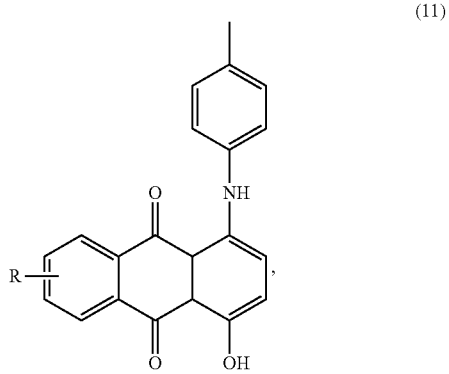

(11)

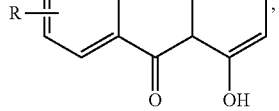

wherein R is selected from the group consisting of H and p-methylphenylamine radical

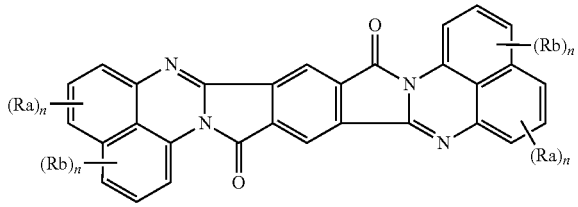

(12a)

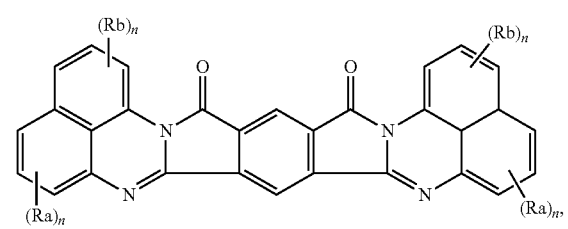

(12b)

wherein
Ra and Rb independently of one another represent a linear or branched alkyl radical or halogen,
n independently of the respective R represents an integer between 0 and 3, wherein the radical for n=0 is hydrogen,

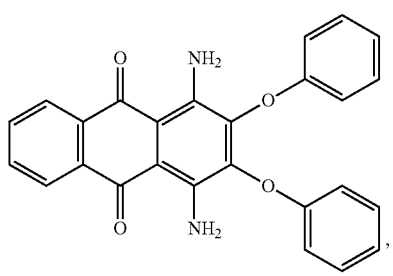
(13)

iv) optionally one or more further colorants selected from the group consisting of the yellow and orange colorants of formulae (14), (15), (16), (17) and/or (18)

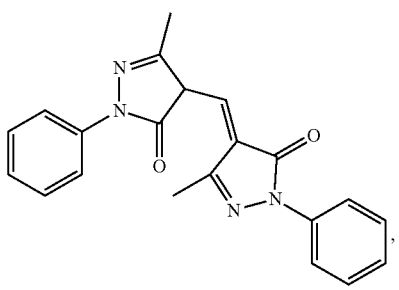
(14)

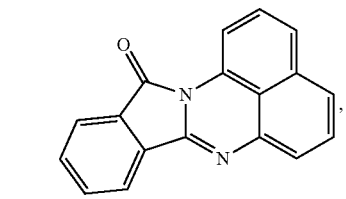
(15)

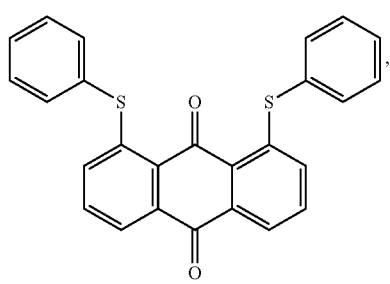
(16)

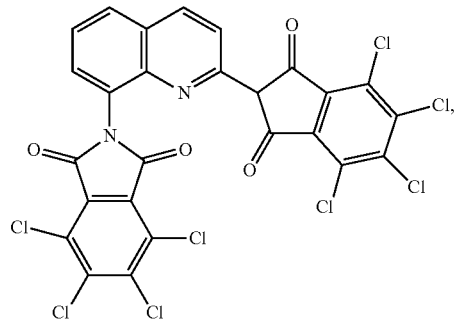
(17)

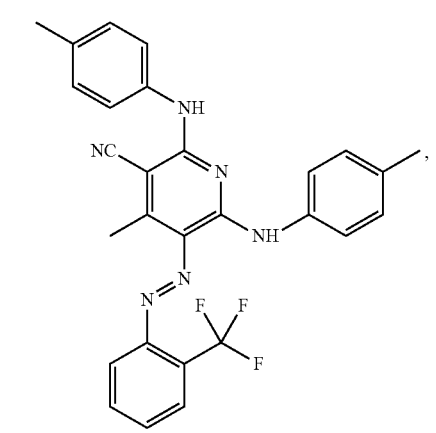
(18)

wherein the sum of the colorants ii) to iv) is >0.05% by weight and wherein the composition contains 0% to less than 30.0% by weight of further thermoplastic polymers, 0% to less than 0.02% by weight of carbon black, in addition to the colorants of groups ii) to iv) less than 0.1% by weight of further colorants and less than 0.1% by weight of white pigment.

* * * * *